(12) United States Patent
Zakrzewski

(10) Patent No.: US 8,406,217 B2
(45) Date of Patent: Mar. 26, 2013

(54) SYNCHRONIZING WIRELESS DEVICES USING TIMESTAMPS AND RELATIVE CLOCK OFFSETS OF THE WIRELESS DEVICES

(75) Inventor: Radoslaw Romuald Zakrzewski, South Burlington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 366 days.

(21) Appl. No.: 12/799,087

(22) Filed: Apr. 16, 2010

(65) Prior Publication Data

US 2011/0255528 A1  Oct. 20, 2011

(51) Int. Cl.
  *H04J 3/06* (2006.01)
(52) U.S. Cl. ........................................ 370/350
(58) Field of Classification Search .......... 370/310–350, 370/503–520
  See application file for complete search history.

(56) References Cited

U.S. PATENT DOCUMENTS

| | | | |
|---|---|---|---|
| 6,577,872 B1* | 6/2003 | Lundh et al. | 455/502 |
| 6,847,917 B2 | 1/2005 | Bechhoefer | |
| 7,161,926 B2 | 1/2007 | Elson et al. | |
| 7,339,957 B2 | 3/2008 | Hitt | |
| 7,496,059 B2 | 2/2009 | Yoon | |
| 2007/0140303 A1* | 6/2007 | Kim et al. | 370/503 |
| 2008/0310321 A1* | 12/2008 | Grilli et al. | 370/252 |
| 2009/0219883 A1* | 9/2009 | Cho et al. | 370/330 |
| 2010/0135263 A1 | 6/2010 | Zakrzewski | |

OTHER PUBLICATIONS

H. Karl and A. Willig, *Protocols and Architectures for Wireless Sensor Networks*, John Wiley, 2005, Table of Contents and Index, 40 pp.

H. Zhai et al., "Performance analysis of IEEE 802.11 MAC protocols in wireless LANs," Wireless Communications and Mobile Computing, 2004; 4: 917-931.

M. Petrova et al., "Performance Study of IEEE 802.15.14 Using Measurements and Simulations," Wireless Communications and Networking Conference, WCNC, 2006. IEEE, vol. 1 (2006), pp. 487-492.

M.L. Sichitiu and C. Veerarittiphan, "Simple, Accurate Time Synchronization for Wireless Sensor Networks," IEEE Wireless Communications and Networking Conference, WCNC 2003, 8 pp.

J. Elson and K. Römer, "Wireless Sensor Networks: A New Regime for Time Synchronization," Proceedings of the First Workshop on Hot Topics in Networks (HotNets-I), Oct. 28-29, 2002, Princeton, NJ, 6 pp.

J. Elson and D. Estrin, "Time Synchronization for Wireless Sensor Networks," Proceedings of the 2001 International Parallel and Distributed Processing Symposium (IPDPS), Workshop on Parallel and Distributed Computing Issues in Wireless Networks and Mobile Computing, Apr. 2001, San Francisco, CA, 6 pp.

S. Ping, "Delay Measurement Time Synchronization for Wireless Sensor Networks," Intel Research Berkeley, IRB-TR-03-013, Jun. 2003, 10 pp.

(Continued)

*Primary Examiner* — Ricky Ngo
*Assistant Examiner* — Wei-Po Kao
(74) *Attorney, Agent, or Firm* — Muirhead and Saturnelli, LLC

(57) ABSTRACT

Wireless communication may be provided between an access point and one or more wireless devices, such as wireless sensors used in avionics applications for sensing, monitoring and control systems. Synchronization of wireless devices may be required so that certain actions, such as data acquisition, are performed at precisely controlled time instances. The system described herein provides for rapid synchronization of wireless devices that does not require the use of prior timing data and that may be performed without communication directly between the wireless devices. Further, techniques are provided for addressing packet losses and packet propagation delays.

26 Claims, 22 Drawing Sheets

OTHER PUBLICATIONS

G. Xiong and S. Kishore, "Discrete-Time Second-Order Distributed Consensus Time Synchronization Algorithm for Wireless Sensor Networks," EURASIP Journal on Wireless Communications and Networking, vol. 2009, Article ID 623537, 12 pp.

G. Xiong and S. Kishore, "Analysis of Distributed Consensus Time Synchronization with Gaussian Delay over Wireless Sensor Networks," EURASIP Journal on Wireless Communications and Networking, vol. 2009, Article ID 528161, 9 pp.

* cited by examiner

SYNCHRONIZING WIRELESS DEVICES USING TIMESTAMPS AND RELATIVE CLOCK OFFSETS OF THE WIRELESS DEVICES

TECHNICAL FIELD

This application relates to the field of wireless communication and, more particularly, to the field of synchronizing wireless devices.

BACKGROUND OF THE INVENTION

Systems exist that use a plurality of sensors to collect data and to use that data in connection with sensing, monitoring and control functionality. Aircraft monitoring systems may use a plurality of sensors that provide sensed data to one or more central processors that use the data to assess the health of system components. For example, U.S. Pat. No. 6,847,917 to Bechhoefer, which is incorporated by reference herein, discloses determining a health indicator of a component using condition indicators (CIs) to parameterize characteristics about a component. The CI's are based on sensed data for the component and facilitate condition-based (rather than schedule-based) maintenance.

Wireless communication is being considered as a replacement for wired data transfer, particularly in avionics systems. Potential advantages of using wireless communication as opposed to wired connections include lower weight, reduced design complexity, easier system reconfiguration, improved diagnostic capabilities, simplified installation and/or easier maintenance. For example, retrofitting new sub-systems into existing aircraft may become substantially easier and cheaper if no new wiring has to be designed and installed, and the use of a large number of sensors to monitor an aircraft's state may become more realistic if it does not lead to an increased amount of wiring. Further, wireless communication may enable the introduction of new sensing technologies into new aircraft design and/or existing aircraft as retrofit options. For the wireless approach to become practically viable, however, it must deliver a level of performance comparable to wired systems, and stringent performance requirements may need to be satisfied. Aircraft applications typically require very high reliability, i.e. data loss has to be very infrequent. The required probability of lost data may be several orders of magnitude lower than that typically considered acceptable by vendors of commercial wireless components. In addition, data latency requirements may be quite strict and a high precision of synchronization may be required.

Synchronization issues arise when multiple devices need to perform the same action at the same time. For example, mechanical diagnostics may involve collection of vibration data from multiple accelerometers. The difference in phase between the vibration signals may be used, among other features, to infer information about the mechanical health of the aircraft. In order to extract phase information, it may therefore be necessary that the acceleration data samples be acquired from different sensors starting at the same time. This may not be achieved, however, by simultaneously commanding all sensor nodes to immediately acquire data since wireless communication can be subject to unpredictable packet losses that may necessitate retransmissions to some of the nodes. Also, transfer of information to and from transceiver modules may be subject to unpredictable delays. Because of this, the same data acquisition command broadcasted to several destinations may reach the sensors at different time instances. This, in turn, may result in different sensors starting data acquisition at different times, leading to incorrect mechanical health information. Accordingly, to be effective, a wireless communication system must address synchronization issues among sensors.

Known wireless transfer systems include synchronization mechanisms internal to their communication protocols. For example, in the IEEE 802.11 standard, the time synchronization function (TSF) provides synchronization in connection with beacon messages transmitted periodically by a single node. However, the internal synchronization information of the wireless transceiver may not be available to an attached device, such as a sensor device, and thus synchronization among multiple sensor devices is still performed through the exchange of time data among the sensors, which remains subject to unpredictable and random transmission delays. For a discussion of known synchronization techniques among wireless devices, see Holger Karl and Andreas Willig, "Protocols and architectures for wireless sensor networks," Wiley, 2005.

One of the particular applications that may be advantageously enabled by wireless technology is aircraft mechanical and structural health monitoring and diagnosis like that noted above (see, e.g., U.S. Pat. No. 6,847,917). Wide-spread introduction of such monitoring systems has been impeded by the necessity to provide wired connections to all sensors. The additional cost and weight of all the associated wiring has tended to outweigh the potential benefits of such systems. Implementation of wireless technology having suitable performance characteristics would help improve the practicality of such health monitoring systems in avionics and other applications.

Accordingly, it would be desirable to provide a wireless communication system that may be suitably used in connection with sensing, monitoring and control systems, such as avionics systems, and that satisfies appropriate performance requirements.

SUMMARY OF THE INVENTION

According to the system described herein, a method of synchronizing a plurality of wireless devices includes sending a first set of multiple reference messages from an access point to each of the plurality of wireless devices. At each of the wireless devices, a timestamp is recorded corresponding to each of the reference messages that is received. In response to a request from the access point, each of the wireless devices sends a response to the access point that includes the timestamps corresponding to the reference messages received at each of the wireless devices. At the access point, relative clock offsets are determined between each of the wireless devices using the timestamps. The method may further include scheduling, at the access point, synchronized actions of the wireless devices according to the relative clock offsets of the wireless devices determined by the access point. Each of the plurality of wireless devices may be a wireless sensor, and each of the wireless sensors may collect data in synchronization with other of the wireless sensors according to the scheduled actions. The access point may determine additional offsets between the access point and the wireless devices using the timestamps attached to the response by the wireless devices and using a first access point timestamp attached to the request by the access point and a second access point timestamp attached to the response received by the access point. In an embodiment, the additional offsets may be less accurate than the relative clock offsets. A second set of multiple reference messages may be sent from the access point to the plurality of wireless devices. Clock drift rate of each of the plurality of wireless devices may be estimated, and the access point may retain data of the clock drift rate for each of the plurality of wireless devices.

According further to the system described herein, a computer readable storage medium stores computer software that synchronizes a plurality of wireless devices, the computer software including executable code that sends a set of multiple reference messages from an access point to each of the plurality of wireless devices. Executable code may be provided that records, at each of the wireless devices, a timestamp corresponding to each of the reference messages that is received. Executable code may be provided that, in response to a request from the access point, sends from each of the wireless devices a response to the access point with the timestamps corresponding to the reference messages received at each of the wireless devices. Executable code may be provided that determines, at the access point, relative clock offsets between each of the wireless devices using the timestamps. Executable code may be provided that schedules, at the access point, synchronized actions of the wireless devices according to the relative clock offsets of the wireless devices determined by the access point. The access point may determine additional offsets between the access point and the wireless devices using the timestamps attached to the response by the wireless devices and using a first access point timestamp attached to the request by the access point and a second access point timestamp attached to the response received by the access point. In an embodiment, the additional offsets may be less accurate than the relative clock offsets.

According further to the system described herein, a method of synchronizing a first wireless device and a second wireless device includes sending a synchronization message from the first wireless device to the second wireless device, wherein the synchronization message includes a first timestamp generated by the first wireless device. The synchronization message may be received at the second wireless device and the second wireless device may record a second timestamp corresponding to receipt of the synchronization message. A synchronization response may be sent from the second wireless device, and the synchronization response may include the first timestamp, the second timestamp, and a third timestamp corresponding to the sending of the synchronization response by the second wireless device. The synchronization response may be received at the first wireless device, and the first wireless device may record a fourth timestamp corresponding to receipt of the synchronization response. A relative clock offset of the first wireless device and the second wireless device may be determined using a set of timestamps including the first timestamp, the second timestamp, the third timestamp and the fourth timestamp. The set of timestamps may include timestamps corresponding to multiple synchronization messages and multiple synchronization responses transmitted according to delay times. The multiple synchronization messages and responses may be transmitted according to random delay times or according to uniformly spaced delay times. The relative clock offset may be determined using at least one of the following: two sorted lists of one-way delays between each of the first wireless device and the second wireless device, and two minimal one-way delays between each of the first wireless device and the second wireless device.

According further to the system described herein, a computer readable storage medium stores computer software that synchronizes a first wireless device and a second wireless device, the computer software including executable code that sends a synchronization message from the first wireless device to the second wireless device, wherein the synchronization message includes a first timestamp generated by the first wireless device. Executable code may be provided that receives the synchronization message at the second wireless device, wherein the second wireless device records a second timestamp corresponding to the synchronization message that is received. Executable code may be provided that sends a synchronization response from the second wireless device, wherein the synchronization response includes the first timestamp, the second timestamp, and a third timestamp corresponding to the sending of the synchronization response by the second wireless device. Executable code may be provided that receives the synchronization response at the first wireless device, wherein the first wireless device records a fourth timestamp corresponding to receipt of the synchronization response. Executable code may be provided that determines a relative clock offset of the first wireless device and the second wireless device using a set of timestamps including the first timestamp, the second timestamp, the third timestamp and the fourth timestamp. The set of timestamps may include timestamps corresponding to multiple synchronization messages and multiple synchronization responses transmitted according to delay times. The multiple synchronization messages and responses may be transmitted according to random delay times or according to uniformly spaced delay times. The relative clock offset may be determined using at least one of the following: two sorted lists of one-way delays between each of the first wireless device and the second wireless device, and two minimal one-way delays between each of the first wireless device and the second wireless device.

BRIEF DESCRIPTION OF THE DRAWINGS

Embodiments of the system are described with reference to the several figures of the drawings that are briefly described as follows.

DETAILED DESCRIPTION OF VARIOUS EMBODIMENTS

Figure 1:
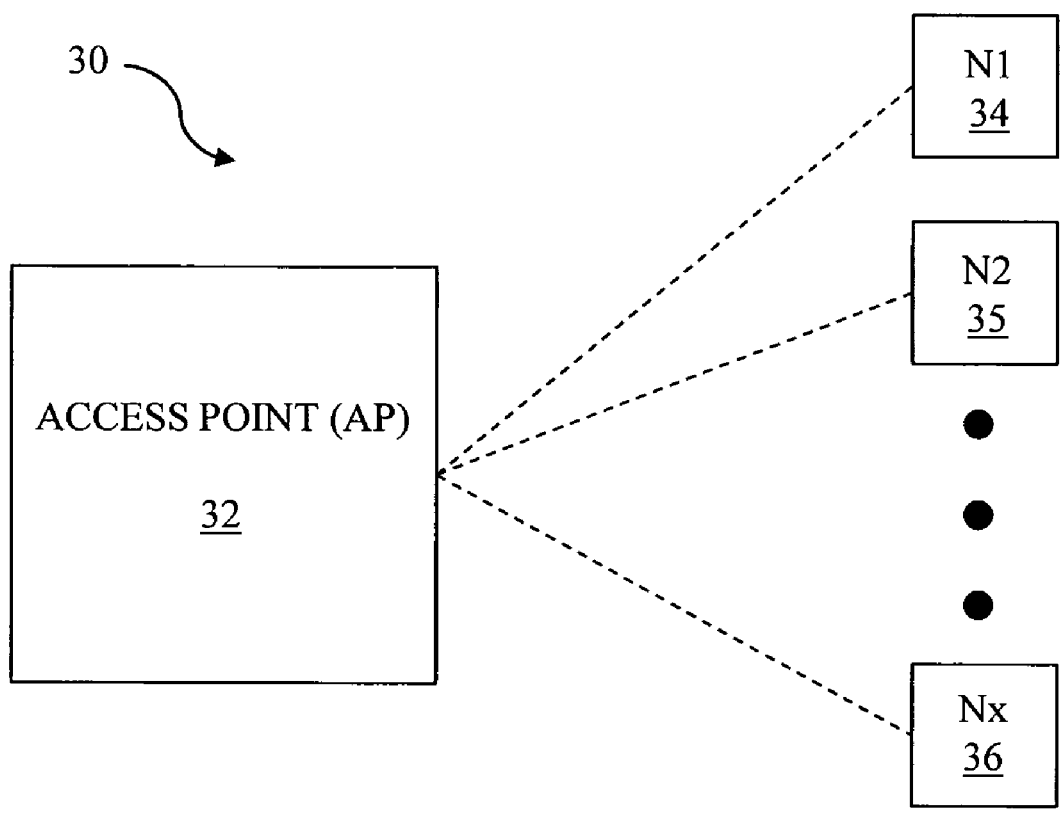
FIG. 1 is a schematic illustration of a wireless sensor system including an access point (AP) and a plurality of sensors according to an embodiment of the system described herein.

FIG. 1 is a schematic illustration of a wireless sensor system 30 that includes a wireless access point (AP) 32 and a plurality of wireless sensors N1, N2, . . . Nx 34-36. The AP 32 exchanges digital data with the sensors 34-36 including sensor data, status information, commands, etc. The AP 32 may include a computer readable storage medium and one or more processors to perform various functions as further discussed elsewhere herein. In an embodiment herein, the sensors 34-36 may be aircraft sensors used to measure aircraft parameters such as temperature, vibration, etc. However, the sensors 34-36 may represent any appropriate wireless data transceiver and thus, reference herein to the sensors 34-36 and/or a subset of the sensors 34-36 should be understood to include a general reference to a wireless data transceiver. Furthermore, there may be any appropriate number of sensors/data transceivers used to provide the functionality described herein. Similarly, although the system described herein is illustrated with the one AP 32, it is possible to use any appropriate number of other AP's to provide the functionality described herein. For example, it may be possible to provide redundant ones of the AP's and/or sensors that take over primary operation upon failure of a corresponding component. Reference is made to co-pending application U.S. patent application Ser. No. 12/156,572 to Zakrzewski, entitled "Wireless Sensor System," filed Jun. 3, 2008, which is incorporated herein by reference.

The AP 32 and the sensors 34-36 communicate using an appropriate wireless frequency and/or protocol in accordance with the system described herein. In various embodiments, the AP and sensor nodes may use off-the-shelf wireless communication devices to communicate wirelessly. The system described herein facilitates wireless digital data communication with variable sized or fixed sized data packets. In some cases, it may be useful to use variable sized data packets to facilitate adjusting the data packet size according to the quality of the wireless data link. A relatively good link favors larger packet sizes to improve data throughput while, conversely, a relatively bad link favors smaller packet sizes.

Synchronization of multiple wireless devices may be provided by estimating the relative clock offsets between the devices. One method for estimating relative clock offsets between devices is known as the Reference Broadcast Synchronization (RBS) method in which multiple nodes use messages from the same sender to mutually synchronize their internal clocks. In RBS, the control node sends a series of broadcast messages which are time-stamped upon receipt by the multiple nodes. Then, the receipt timestamps are exchanged between the receiver nodes so that each may calculate its estimated clock offset relative to other receivers. It is noted, however, that, in accordance with discussion of known synchronization techniques elsewhere herein, a disadvantage of the RBS method is that it requires message traffic between subordinate sensor nodes. Allowing message exchanges initiated by individual sensors may undesirably lead to message collisions and network indeterminism. Furthermore, individual sensor pairs may be outside of each other's transmission reach, requiring the use of increased signal power or multi-hop transmissions to provide full determinism of the sensor network.

According to various embodiments of the system described herein, direct sensor-to-sensor traffic may be eliminated and all sensors may instead communicate only with a central node in connection with synchronization, for example in a star network configuration. In accordance with time stamp information received from individual sensors at the central node, instead of commanding the sensors to start data acquisition immediately, the central control node may select a time instant in the future and calculate the clock values of the sensor devices to correspond to the same chosen future time instant. Those clock values may then be used in connection with the timing of data acquisition commands sent to the sensors. Based on the clock values sent from the central node, the internal clocks of the sensors may be synchronized through clock adjustment and/or the data acquisition commands may be sent to different sensor devices specifying different starting times according to the calculated relative offsets of the different sensor devices in a way that causes the different sensor devices to act at the same physical time instant. A description of various techniques for performing wireless device synchronization are provided in detail elsewhere herein.

In an embodiment, the AP 32 may act as a central node in a star network that includes the sensors 34-36. In various embodiments, the AP 32 may be implemented using any appropriate hardware, such as an off-the-shelf processor and/or transceiver hardware capable of providing the functionality described herein. In an embodiment, the AP 32 may be powered externally so that, generally, operation of the AP 32 does not require significant conservation of power. The sensors 34-36, on the other hand, may have constraints that necessitate conserving power in connection with operation thereof, as further discussed elsewhere herein.

Each of the sensors 34-36 may communicate directly with the AP 32 and vice versa so that the sensors 34-36 do not necessarily communicate with each other. In addition, in an embodiment herein, each of the sensors 34-36 may be individually addressable by the AP 32 and the sensors 34-36 may not transmit anything unless specifically requested to do so by the AP 32. Such an arrangement may reduce the likelihood of wireless data collisions. Of course, special provisions may be made for initial configuration so that the AP 32 can learn the identity of new sensors. As described in more detail elsewhere herein, in some instances, one or more of the sensors 34-36 may enter a low power state (sleep) for a predetermined amount of time and then enter a different state to receive transmissions (requests) from the AP 32, if any.

Figure 2A:
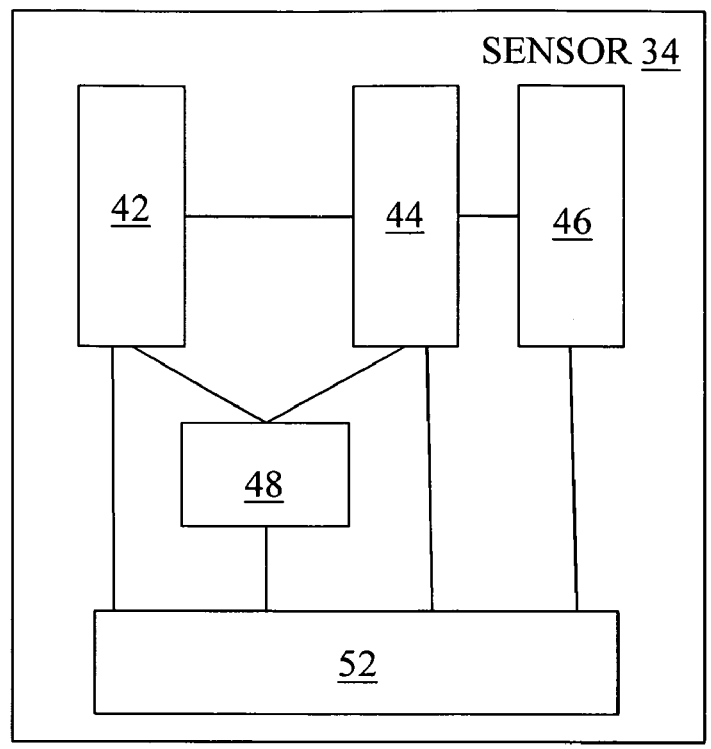
FIG. 2A is a schematic illustration of a sensor and corresponding components thereof according to an embodiment of the system described herein.

In FIG. 2A, an embodiment of the sensor 34 is shown in more detail as including sensor components 42, a microcontroller or other processor 44, a transceiver 46, a memory 48, and a power source 52. The other sensors 35, 35 may have a similar configuration as the sensor 34. The sensor components 42 may provide appropriate sensing functionality according to the particular application. For example, the sensor components 42 may include temperature sensing components, vibration sensing components, etc. Of course, in embodiments where other types of wireless data devices are used instead of sensors 34-36, then the sensor components 42 may be replaced with another type of data source/interface, as appropriate. Note that the transceiver 46 should be understood as including a single transceiver chip or a more complicated circuit/board that may include more components. Similarly, the processor 44 may be understood as including a single processor chip, or a more involved circuit/board. Accordingly, the components illustrated herein denote functional blocks that perform certain functions, rather than necessarily representing particular discrete components. In that regard, the system described herein may be implemented using a single chip that combines transceiver and processor functions, and possibly also includes some memory.

The processor 44 may be coupled to, and receive data from, the sensor components 42. The processor 44 may be any type of processor capable of providing the functionality described herein. The processor 44 may consume relatively little power and be capable of being placed in an idle (sleep) mode that consumes even less power or possibly even no power at all. The processor 44 may include a timer that functions as further described elsewhere herein, for example, a high precision (sub-millisecond) timer that may be restarted when the sensor node wakes up from a sleep node.

The transceiver 46 may be coupled to the processor 44 and handle wireless communication between the sensor 34 and the AP. In an embodiment herein, the transceiver 46 may communicate with the AP 32 using the IEEE 802.15.4 protocol, possibly adapted for higher data rates, or use any other appropriate protocol, including protocols that provide for high speed packet based digital data exchange. In some instances, it may be possible to use the IEEE 802.11 protocol with UDP. In some embodiments, the frequencies of 2.4 GHz and 5.8 GHz may be avoided in order to reduce the likelihood of interference from consumer electronics, such as cell phones, wireless data networks, etc. Of course, the system described herein does not depend upon the use of any particular communication protocol or class of protocols and does not depend on the use of any particular frequency or frequencies.

The memory 48 may be coupled to the sensor components 42 and the processor 44 and may be used to store data retrieved by the sensor components 42, temporary data generated by the processor 44 in connection with operation thereof, etc. In an embodiment herein, the memory may be volatile memory (e.g., semiconductor RAM) while the processor 44 uses non-volatile memory (not shown) for software thereof that includes processor instructions, constant data values used for execution, etc. Of course, any appropriate type of memory may be used.

The power source 52 is coupled to the sensor components 42, the processor 44, the transceiver 46, and the memory 48. The power source 52 may be a battery (rechargeable or not), a fuel cell, or any other component capable of generating electrical power for operation of electronic portions of the sensor 34. The system described herein may conserve power of the sensors 34-36 (i.e., power from the power source 52) to minimize the frequency at which the power source 52 needs to be replaced, recharged, or otherwise renewed. Note, however, that it may be assumed that the AP 32 is coupled to an external power source and thus does not have similar power use issues.

Figure 2B:
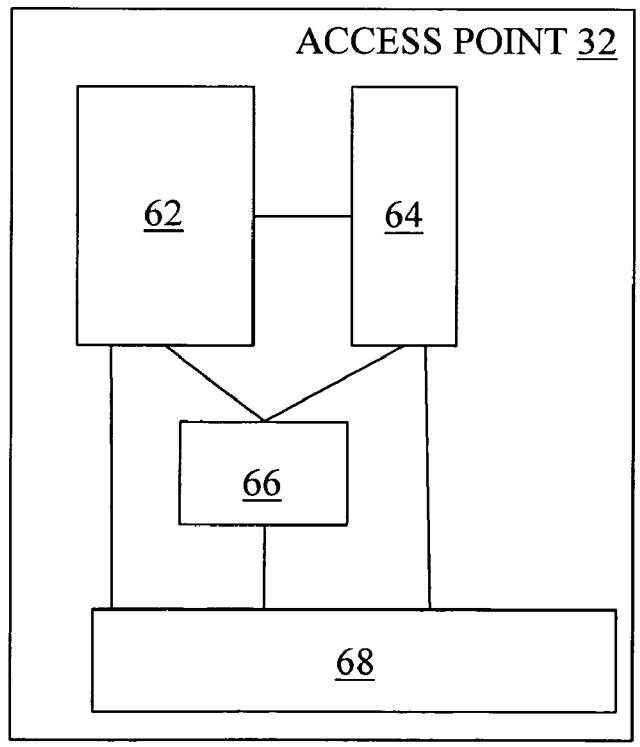
FIG. 2B is a schematic illustration of an access point and corresponding components thereof according to an embodiment of the system described herein.

In FIG. 2B, an embodiment of the AP 32 is shown in more detail as including a microcontroller or other processor 62, a transceiver 64, a memory 66, and a power source 68. Note that the transceiver 64 should be understood as including a single transceiver chip or a more complicated circuit/board that may include more components. Similarly, the processor 62 may be understood as including a single processor chip, or a more involved circuit/board. Accordingly, the components illustrated herein denote functional blocks that perform certain functions, rather than necessarily representing particular discrete components. In that regard, the system described herein may be implemented using a single chip that combines transceiver and processor functions, and possibly also includes some memory.

The processor 62 may be any type of processor capable of providing the functionality described herein. In an embodiment, the processor 62 may include a timer that functions as further described elsewhere herein, for example, having a similar accuracy as the timer discussed with respect to the processor 44 of the sensor node 34. The transceiver 64 may be coupled to the processor 62 and handle wireless communication between the AP 32 and the sensors 34-36. In an embodiment herein, the transceiver 64 may communicate with one or more of the sensors 34-36 using the IEEE 802.15.4 protocol, possibly adapted for higher data rates, or use any other appropriate protocol, including protocols that provide for high speed packet based digital data exchange. In some instances, it may be possible to use the IEEE 802.11 protocol with UDP. In some embodiments, the frequencies of 2.4 GHz and 5.8 GHz may be avoided in order to reduce the likelihood of interference from consumer electronics, such as cell phones, wireless data networks, etc. Of course, the system described herein does not depend upon the use of any particular communication protocol or class of protocols and does not depend on the use of any particular frequency or frequencies.

The memory 66 may be coupled to the processor 62 and may be used to store data generated by the processor 62 in connection with operation thereof, etc. In an embodiment herein, the memory 66 may be volatile memory (e.g., semiconductor RAM) while the processor 62 uses non-volatile memory (not shown) for software thereof that includes processor instructions, constant data values used for execution, etc. Of course, any appropriate type of memory may be used.

The power source 68 may be coupled to the processor 62, the transceiver 64, and the memory 66. The power source 68 may be a battery (rechargeable or not), a fuel cell, or any other component capable of generating electrical power for operation of electronic portions of the AP 32. Alternatively, in other embodiments, the AP 32 may be coupled to an external power source. Accordingly, although power of the AP 32 may be conserved like that discussed herein in connection with the sensors 34-36, in embodiments where the AP 32 is coupled to an external power source, power conservation may not be required and power use not an issue.

Figure 3:
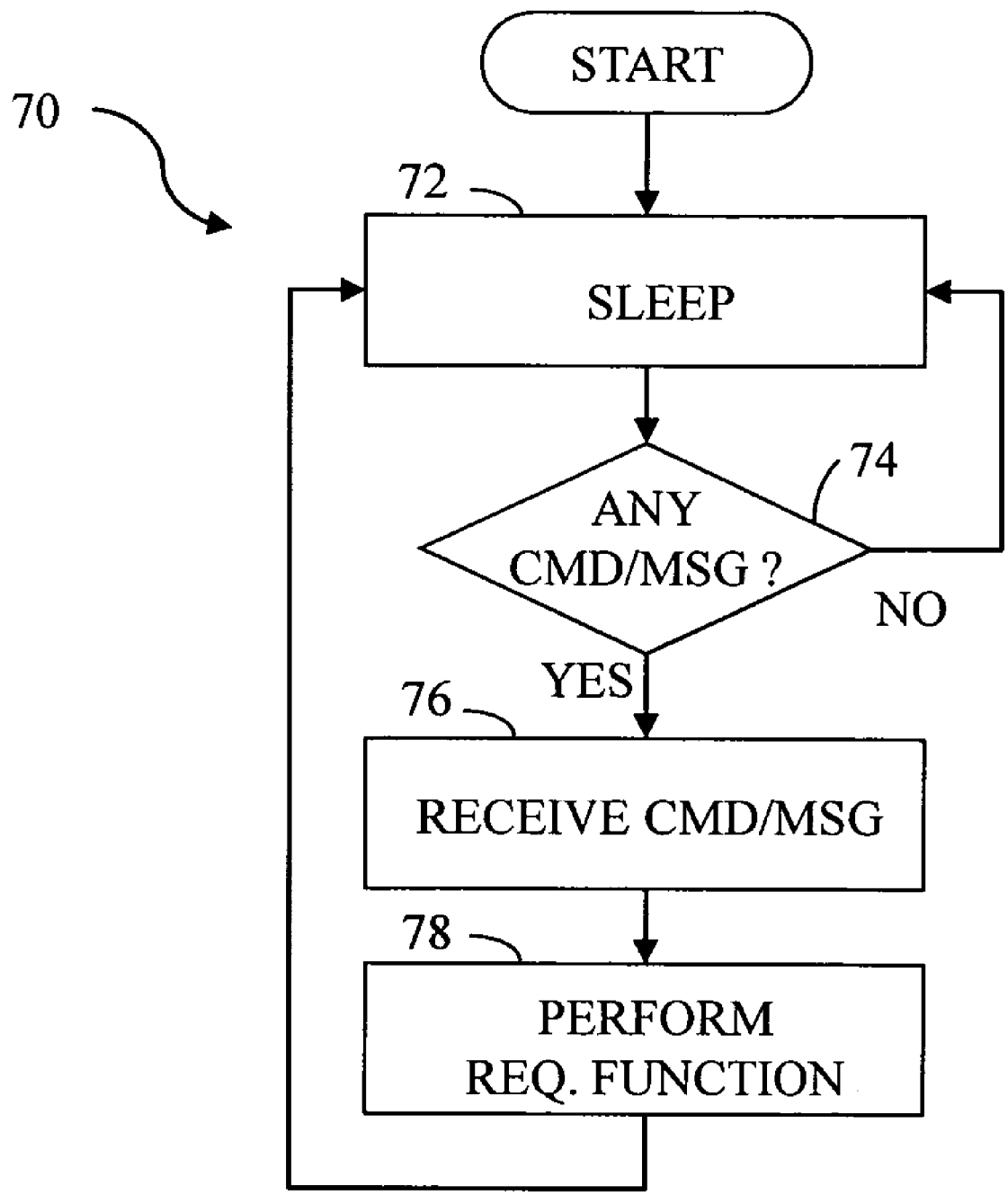
FIG. 3 is a flow chart illustrating basic operation of a sensor according to an embodiment of the system described herein.

FIG. 3 shows a flow chart 70 illustrating steps performed by each of the sensors 34-36 at the direction of the AP 32. Generally, a sensor operates in a reduced power usage state (sleeps) for a predetermined amount of time before waking up to see if the AP 32 is communicating therewith. If the AP 32 is not communicating with the sensor, the sensor goes back to sleep. There may be different sleep modes, different amounts of time a sensor spends sleeping each cycle, different amounts of time a sensor waits for communication from the AP 32, etc., all of which is explained in more detail elsewhere herein.

Processing for the flow chart 70 begins at a step 72 where the sensor sleeps. In an embodiment herein, the sensor sleeps by powering down some or all components except those necessary to maintain the sleep time for each cycle and to wake up the sensor when the sleep time expires. Since it is desirable to conserve power, then, ideally, as many components as possible may be powered down. In some embodiments, there may be two sleep modes: a shallow sleep mode where the volatile memory 48 is not powered down during the sleep cycle, thus retaining data, state information, etc., and a deep sleep mode where the memory 48 is powered down, thus causing any data stored therein to be lost. The sleep time for shallow sleep may be shorter than that for deep sleep. For example, the sleep time for shallow sleep may be two seconds while the sleep time for deep sleep may be forty seconds. Of course, other times may be used. The deep sleep mode may be used when the aircraft is not in use (e.g., on the ground in a hangar) while the shallow sleep mode may be used, for example, between data collection cycles during operation of the aircraft. Note, of course, that it may be possible to provide any number of different sleep modes having different characteristics, cycle times, etc.

Following the step 72 is a test step 74 where the sensor wakes up (leaves the sleep state) and determines if the AP 32 is communicating with the sensor. In an embodiment herein, the sensor remains awake for one millisecond to wait for a communication from the AP 32. Of course, a different amount of awake time may be used. If no communication comes while the sensor is awake, then control transfers from the test step 74 back to the step 72 to sleep for another cycle. Otherwise, control transfers from the test step 74 to a step 76 where the sensor receives the communication from the AP 32. Following the step 76 is a step 78 where the sensor takes whatever action is indicated by the communication received at the step 76. As discussed in more detail elsewhere herein, the actions may include providing status information, scheduling a sensor reading, returning sensor data, adjusting the sensor internal clock, etc. Following the step 78, control transfers back to the step 72, discussed above, for another iteration.

Figure 4:
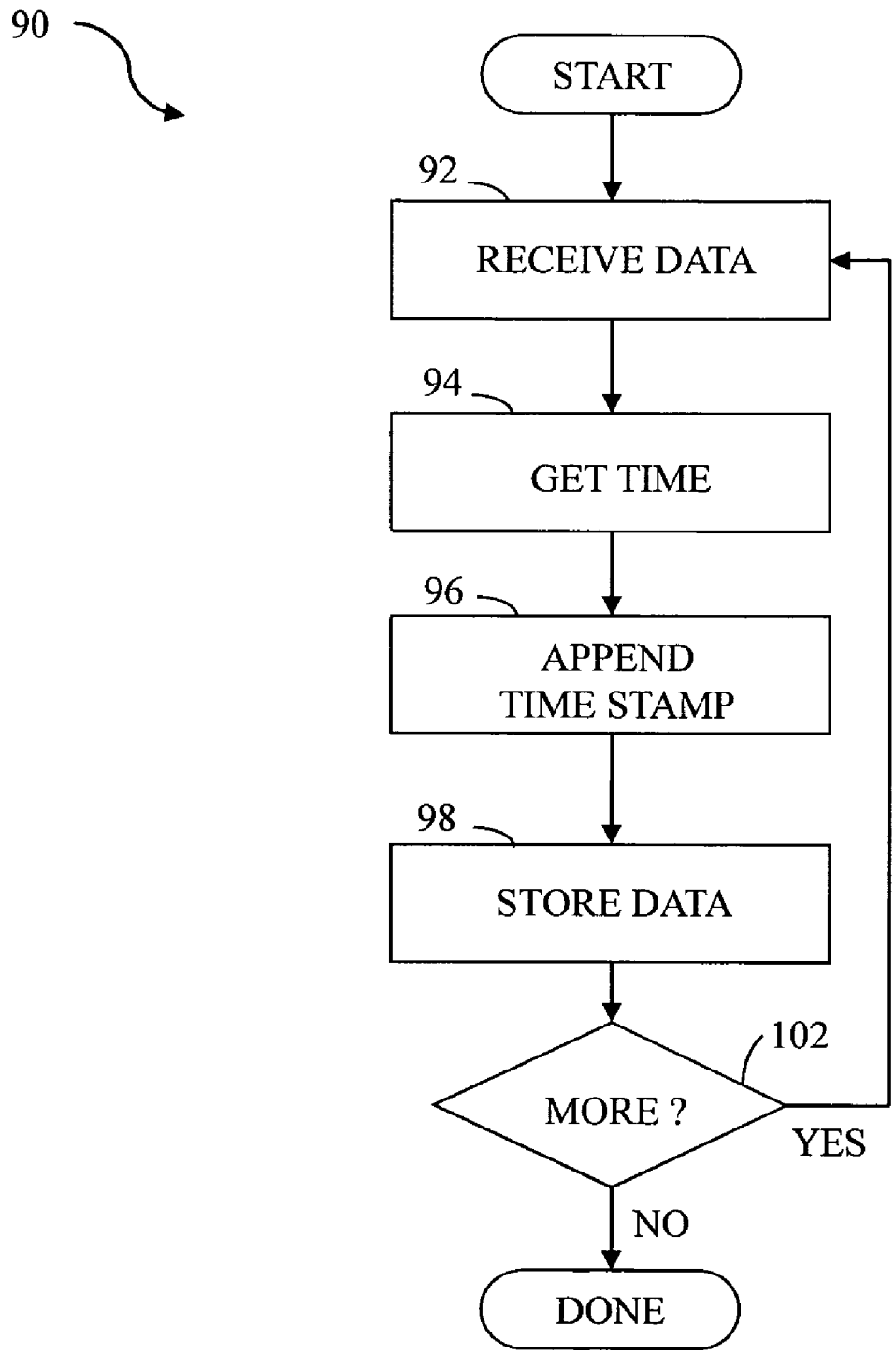
FIG. 4 is a flow chart illustrating a sensor receiving a message/command from an AP according to an embodiment of the system described herein.

FIG. 4 shows a flow chart 90 that illustrates steps performed in connection with a sensor receiving a message/command from the AP 32. Processing begins at a first step 92 where the sensor receives the data (message/command) transmitted by the AP 32. Following the step 92 is a step 94 where the sensor obtains its own internal time information. Each of the sensors 34-36, and the AP 32, have an internal timing mechanism that may be adjusted, as described in more detail elsewhere herein. Following the step 94 is a step 96 where the time data obtained at the step 94 is appended to the received message. Use of the time information to determine when and how to adjust internal timing mechanisms is discussed in more detail elsewhere herein.

Following the step 96 is a step 98 where the received message is stored (i.e., in the memory 48). Following the step 98 is a test step 102 where it is determined if there is more data (for the command/message) to be received. In various embodiments, the information may be transmitted using fixed length and/or variable length packets. In an embodiment using variable length data packets, the length may be adjusted based on the quality of the wireless communication link between the sensor and the AP 32. Thus, it may be possible for a particular command/message to span more than one data packet. If it is determined at the test step 102 that there is not more data to be received, then processing is complete. Otherwise, control transfers back to the step 92 to receive the additional data.

Figure 5:
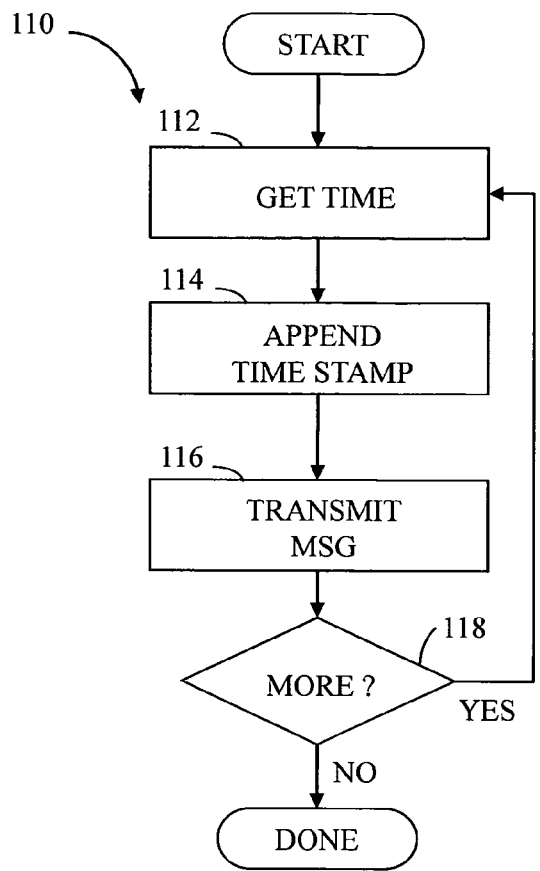
FIG. 5 is a flow chart of a sensor sending a message/data according to an embodiment of the system described herein.

FIG. 5 shows a flow chart 110 that illustrates steps performed in connection with a sensor sending information (message/data) to the AP 32. Processing begins at a first step 112 where the sensor obtains time information from its own internal clock. Following the step 112 is a step 114 where the sensor appends the time information to the outgoing data. Just as adding time information to incoming data, adding time information to outgoing data may be used to determine when and how to adjust the internal time.

Following the step 114 is a step 116 where the message/data is transmitted to the AP 32 using, for example, the transceiver 46. Following the step 116 is a test step 118 where it is determined if there is more of the message to send. Just as with information transmitted by the AP 32 to the sensor, information transmitted from the sensor to the AP 32 may be transmitted using variable length data packets where the length may be adjusted based on the quality of the wireless communication link between the sensor and the AP 32 so that it is possible for a particular message to span more than one data packet. If it is determined at the test step 118 that there is not more data to transmit, then processing is complete. Otherwise, control transfers from the test step 118 back to the step 112 to transmit the additional data.

In an embodiment herein, it is possible for the AP 32 to send explicit commands to one or more of the sensors 34-36 to cause a sensor to enter the sleep mode and/or to transition from one sleep mode to another (e.g., shallow sleep to deep sleep). The AP 32 may indicate to the sensor the type (mode) of sleep and possibly even the amount of time to sleep. It may be desirable to have a sensor that receives a sleep command go to sleep immediately, and thus not indicate to the AP 32 that the sleep command was properly received. Accordingly, the sleep command may be sent from the AP 32 a number of times to increase the likelihood that the sleep command was properly received.

Figure 6:
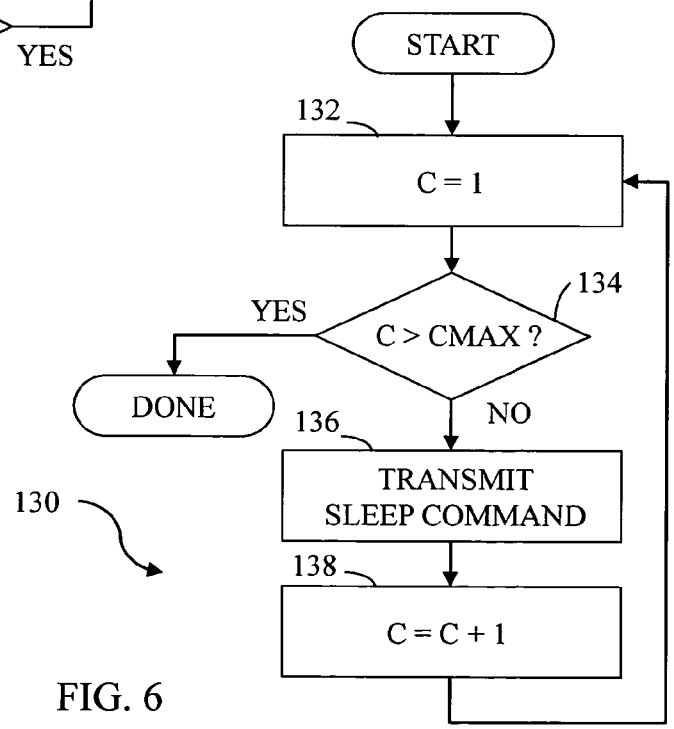
FIG. 6 is a flow chart illustrating an AP transmitting a sleep command to one or more sensors according to an embodiment of the system described herein.

FIG. 6 shows a flow chart 130 that illustrates steps performed by the AP 32 in connection with the AP 32 sending a sleep command to one or more of the sensors 34-36. In an embodiment herein, the AP 32 may be able to simultaneously address multiple ones of the sensors 34-36 with a single sleep command transmission. In other embodiments, all commands transmitted by the AP 32 may only be directed to a single one of the sensors 34-36.

Processing for the flow chart 130 begins at a step 132 where a counter, C, is initialized to one. Following the step 132 is a test step 134 where it is determined if C exceeds a predetermined value, CMAX, that represents a number of times that the AP 32 will transmit the sleep command. In an embodiment herein, CMAX may be set to five, although other appropriate values may be used. In some instances, CMAX may be set by empirically observing sensor behavior and determining an acceptable value that is expected to be properly received by the sensors 34-36 in some number (percentage) of attempts. In some cases, CMAX may vary according to the identity of the particular one of the sensors 34-36 to which the sleep command is being directed.

If it is determined at the test step 134 that C is greater than CMAX, then processing is complete. Otherwise, control passes from the step 134 to a step 136 where the AP 32 transmits the sleep command to one or more of the sensors 34-36. In an embodiment herein, the sleep command may include the desired mode of sleep (e.g., shallow or deep) and/or may include a desired time for sleeping. For example, if the AP 32 desires data from a particular one of the sensors 34-36 every X seconds, then the AP 32 may, after receiving data, direct the particular one of the sensors 34-36 to sleep for approximately X seconds (probably slightly less). In other instances, it is possible for the AP to send a specific time at which the sensor is to wake up based on the sensor's clock, which is synchronized with the AP's clock. Following the step 136 is a step 138 where the index variable, C, is incremented. Following the step 138, control transfers back to the test step 134 for another iteration.

Figure 7:
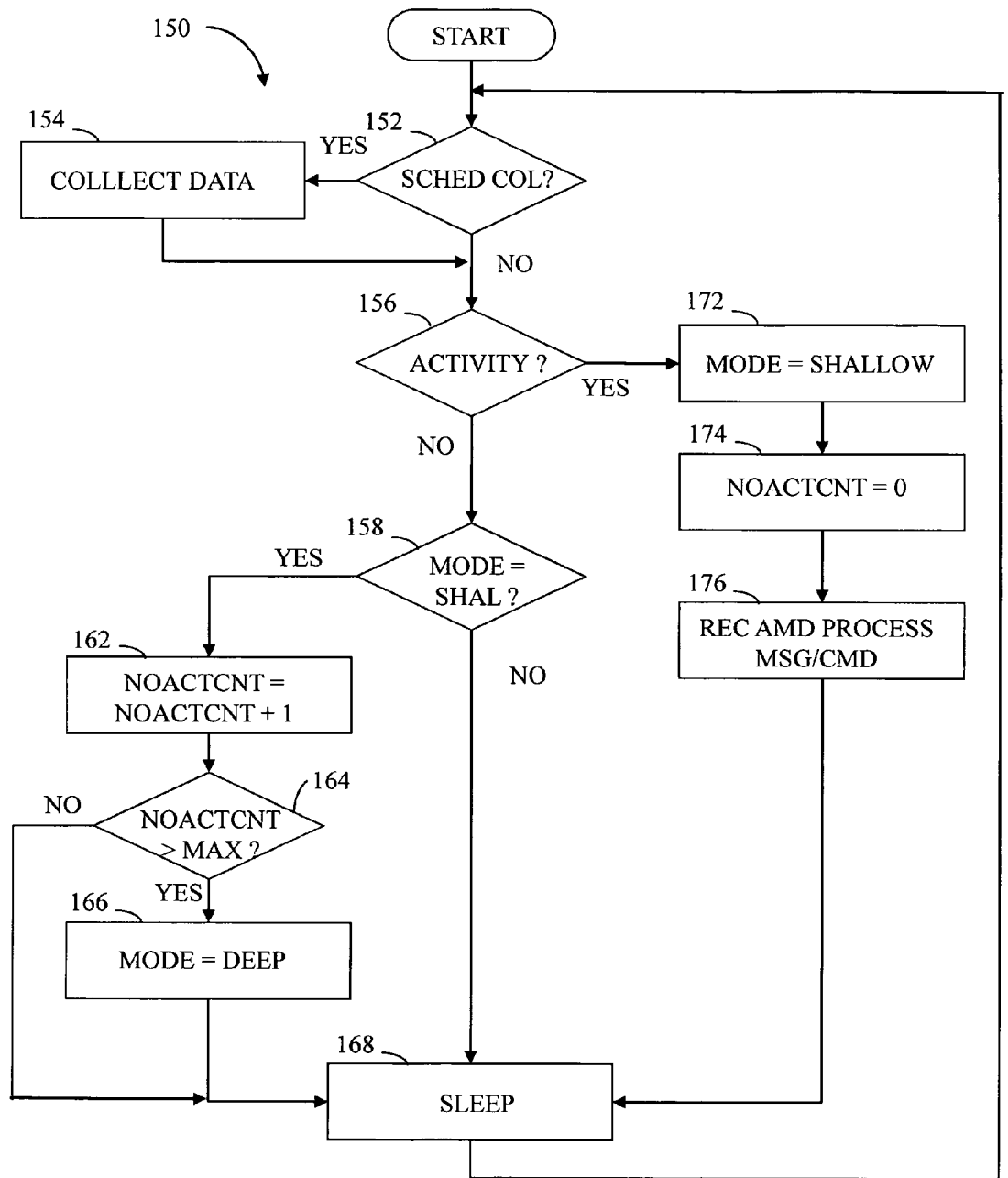
FIG. 7 is a flow chart illustrating processing performed by a sensor in connection with waking up according to an embodiment of the system described herein.

FIG. 7 shows a flow chart 150 that illustrates steps performed by a sensor in connection with periodically waking up (leaving the sleep state). Processing begins at a first test step 152, where it is determined if it is time to perform a data collection. As discussed in more detail elsewhere herein, it is possible to schedule periodic data collections by the sensors 34-36 and/or a subset thereof. Accordingly, if it is determined at the test step 152 that it is time for data collection by the sensor, then control passes from the test step 152 to a step 154 where the data is collected. Of course, collecting the data at the step 154 depends on the type of sensor, the specific data requested/needed, etc.

Following the step 154, or following the step 152 if there is no sensor data collection scheduled, is a test step 156 where it is determined if there is any communication activity from the AP 32 directed at the sensor. As discussed elsewhere herein, the sensor remains awake for a predetermined amount of time waiting for communication from the AP 32. If it is determined at the step 156 that there is no communication activity from the AP 32 directed to the sensor, then control transfers from the step 156 to a test step 158 where it is determined if the sensor is currently in the shallow sleep mode. As discussed in more detail elsewhere herein, in some embodiments the sensors 34-36 may have two sleep modes: a shallow sleep mode where the sleep cycle time is relatively short and a deep sleep mode where the sleep cycle time is relatively long.

If it is determined at the test step 158 that the sensor is currently in a shallow sleep mode, then control transfers from the test step 158 to a step 162 where a no activity counter variable, NOACTCNT, is incremented. The NOACTCNT variable determines the number of successive cycles for which the sensor did not detect any communication from the AP 32 directed to the sensor. Following the step 162 is a test step 164 where it is determined if NOACTCNT exceeds a predetermined limit for the number of times a sensor in a shallow sleep mode can detect no activity before placing itself to deep sleep mode. In an embodiment herein, the limit used at the test step 164 corresponds to W seconds, but of course other values may be used. If it is determined at the step 164 that NOACTCNT is greater than the predetermined limit, then control transfers from the step 164 to a step 166 where the sensor places itself in a deep sleep mode.

Following the step 166 or the step 164 if NOACTCNT is not greater than the limit is a step 168 where the sensor sleeps. The amount of time that the sensor sleeps at the step 168 depends, at least in part, on whether the sensor is in a deep sleep mode or a shallow sleep mode (or possibly some other mode). Furthermore, in some embodiments, the AP 32 may direct the sensor to sleep for a specific amount of time and/or until a particular time (e.g., until it is time to collect more sensor data). Note that the step 168 is also reached from the step 158 if it is determined at the step 158 that the sensor is not in the shallow sleep mode. Following the step 168, control transfers back to the step 152, discussed above, for another iteration.

If it is determined at the step 156 that the AP 32 has sent a command/message to the sensor, then control transfers from the step 158 to a step 172 where the sensor is explicitly placed in the shallow sleep mode. Note that if the sensor is already in the shallow sleep mode, then the processing at the step 172 will not affect the state of the sensor but that if the sensor was in a deep sleep mode (or some other mode) prior to the step 172, then the processing at the step 172 changes the sleep mode of the sensor. Following the step 172 is a step 174 where the NOACTCNT variable is set to zero. Following the step 174 is a step 176 where the command/message from the AP 32 is received and processed, as described in more detail elsewhere herein. Following the step 176, control transfers to the step 168, discussed above, to cause the sensor to sleep.

In some instances, a sensor may receive the same command/message a number of times from the AP 32 because the AP 32 is not receiving the response (acknowledgement) from the sensor due to poor data link quality from the sensor to the AP 32. Similarly, the AP 32 may send the same command/message a number of times to a sensor before the command/message is properly received by the sensor due to poor data link quality from the AP 32 to the sensor. It is useful to be able to distinguish between the two different cases to determine whether to adjust the transmit power of the sensor, the transmit power of the AP, or both. Accordingly, in some instances each message/command provided by the AP 32 may be assigned a unique numeric identifier (e.g., serial number) so that a sensor can distinguish between different instances of commands/messages from the AP 32. In addition, a sensor may use the identifier to keep track of the number of times it sees each particular command/message. Note also that there may be other parameters that control packet delivery rates, such as the number of repeated retransmissions of commands or sensors responses. In some embodiments, if the AP 32 detects that most commands sent by the AP 32 are lost, the AP 32 may want to increase the number of retransmission instead of increasing transmit power. For different transceivers, the energy trade-offs may be different.

Figure 8:
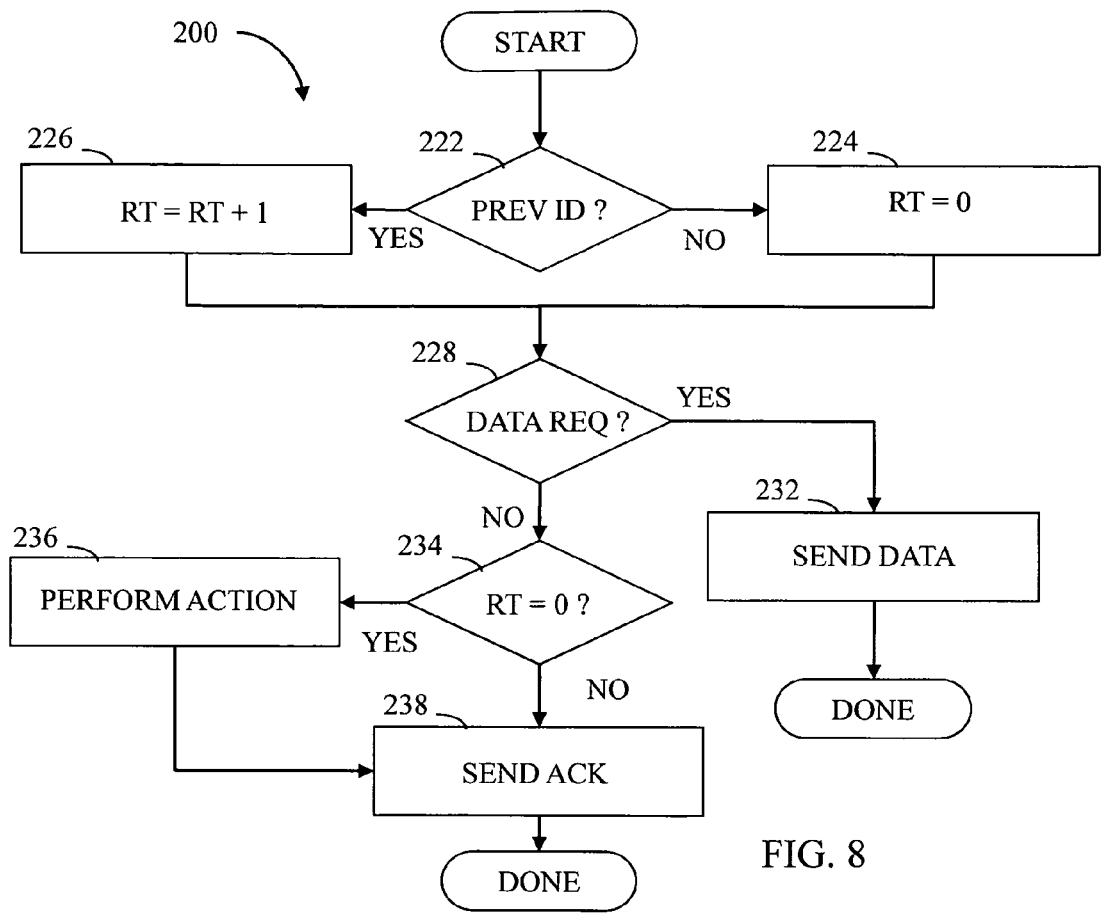
FIG. 8 is a flow chart illustrating processing performed by a sensor in connection with receiving a message/command according to an embodiment of the system described herein.

FIG. 8 shows a flow chart 200 that illustrates steps performed by a sensor in connection with providing information regarding communication data link quality between the sensor and the AP 32. Processing begins at a first test step 222 where the sensor determines if the command/message that has been received had been previously received. The test at the step 222 examines the identifier (serial no.) of the received command/message. As discussed elsewhere herein, the AP 32 assigns a unique identifier to to each command/message. Thus, if the identifier of the received command/message is the same as that of a command/message already received, then it is the same command/message being resent by the AP 32.

If it is determined at the test step 222 that the identifier of the received message/command does not match that of one already received, then control transfers from the test step 222 to a step 224 where a retry count variable (RT) associated with the identifier is initialized to zero. Otherwise, if it is determined at the test step 222 that the identifier of the received message/command matches that of one already received, then control transfers from the test step 222 to a step 226 where RT is incremented. Following the step 224 or the step 226 is a test step 228 where it is determined if the message/command from the AP 32 is requesting data (as opposed to requesting that some action be performed, like changing the clock time). If it is determined at the test step 228 that the message/command from the AP 32 is for data, then control transfers from the test step 228 to a step 232 where the sensor sends the data to the AP 32 (along with the RT value and the time stamps, discussed above). In an embodiment herein, all requests for data by the AP 32 are serviced no matter how many identical prior requests had already been serviced. Following the step 232, processing is complete.

If it is determined at the test step 228 that the message/command from the AP 32 is not a request for data, then control transfers from the test step 28 to a test step 234 where it is determined if RT is zero (first instance of message/command from the AP 32). If it is determined at the test step 234 that RT is zero, then control transfers from the test step 234 to a step 236 where the action requested by the AP 32 (e.g., change internal clock time) is performed. Following the step 236 or following the step 234 if RT does not equal zero is a step 238 where the sensor sends an acknowledgement back to the AP 32. The acknowledgement may include the value of RT, the time stamps, etc. Following the step 238, processing is complete.

Figure 9:
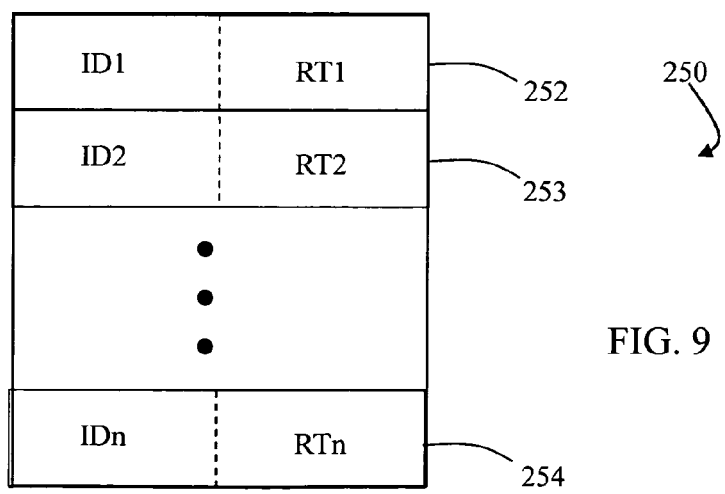
FIG. 9 is a schematic diagram illustrating a table used by a sensor to correlate identifiers and retry counts according to an embodiment of the system described herein.

FIG. 9 is a schematic illustration showing a table 250 that is maintained by a sensor includes a plurality of entries 252-254 that correlate different identifiers with different RT variables. For example, the entry 252 indicates that ID1 has been received by the sensor RT1 times (or RT1 plus one times, depending upon whether RT is initialized to zero or one). The table 250 may be consulted in connection with performing processing illustrated by the flow chart 200, discussed above. In an embodiment herein, the table 250 may be implemented as a linked list, although other appropriate data structures may be used. Note also that, to preserve storage space in the memory 48, a sensor may discard the oldest entries in the table 250 as more space is needed for new entries. If the identifiers are numerically sequential, then the entries having the lowest numerical value may be the oldest.

Figure 10:
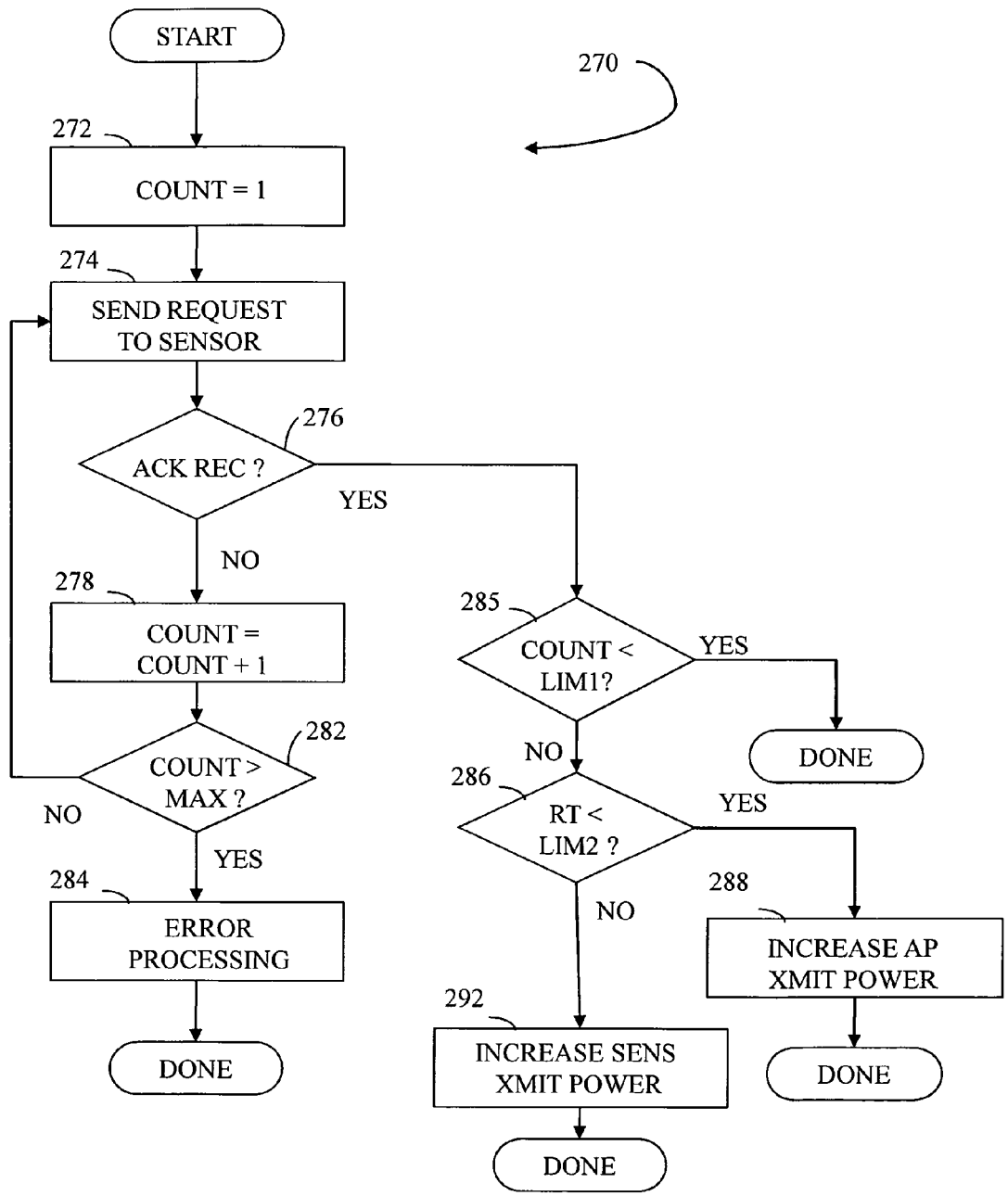
FIG. 10 is a flow chart illustrating processing performed by an AP in connection with transmission of a message/command to a sensor.

FIG. 10 shows a flow chart 270 that illustrates steps performed by the AP 32 in connection with exchanging information with sensors and adjusting transmitting power on the AP 32 and/or a sensor. Processing begins at a first step 272 where a variable, COUNT, is set to one. The COUNT variable keeps track of how many times the AP 32 transmits the same message to the sensor. Following the step 272 is a step 274 where the message/command is sent by the AP 32. Following the step 274 is a step 276 where the AP 32 determines if the sensor has acknowledged the message/command (replied in some fashion). If not, then control transfers from the step 276 to a step 278 where the COUNT variable is incremented. Note that acknowledgement by a sensor may be explicit (acknowledge message sent) or implicit (e.g., AP 32 requests particular data and the sensor returns the requested data).

Following the step 278 is a test step 282 where it is determined if the value of the COUNT variable has exceeded some limit (i.e., has the number of attempted transmissions exceeded some limit). If so, then control transfers from the step 282 to a step 284 where appropriate error processing is performed (e.g., log error, report to user, etc.). Following the step 284, processing is complete. Note that, in some embodiments, it may be possible to increase transmission power of the AP 32 at the step 284 and then retry transmission by transferring control back to the step 272. Note also, however, that if the transmission problem is due to the sensor not using enough power to transmit back to the AP 32, then the problem will not be fixed by increasing the transmission power of the AP 32, but, instead, is fixed by having the sensor increasing its transmit power.

If it is determined at the step 276 that the sensor has acknowledged (implicitly or explicitly) the message/command from the AP 32, then control transfers from the step 276 to a test step 285 where it is determined if the value of the COUNT variable is less than a predetermined limit. Note that the limit used at the step 285 is not greater than the limit used at the step 282. The limit used at the step 285 determines if transmission between the AP 32 and the sensor occurs in a reasonable number of attempts. For example, one or two attempts would tend to indicate that the wireless link between the AP 32 and the sensor is good while a dozen attempts would tend to indicate otherwise. Of course, the limit at the step 285 may be set based on a variety of factors such as the desired retransmission rate, the desired throughput, available bandwidth, available transmission power at both the AP 32 and the sensor, etc.

If it is determined at the step 285 that the value of COUNT does not exceed the limit, then processing is complete. Otherwise, control transfers from the test step 285 to a test step 286 where the retry value returned by the sensor (RT) is examined. Note that if RT is relatively high (close to the value of COUNT), it means that most if not all of the transmissions from the AP 32 provided at the step 272 were received by the sensor and that the AP 32 did not receive most of the responses back from the sensor. Conversely, the value of RT being relatively low may indicate that most of the transmissions from the AP 32 to the sensor were not received by the sensor. Accordingly, the test at the step 286 compares the value of RT to a predetermined limit. If RT is less than the limit (relatively low), then control transfers from the test step 286 to a step 288 where the transmission power of the AP 32 is increased. Otherwise, control transfers from the test step 286 to a step 292 where the AP 32 sends a command to the sensor to cause the sensor to increase the transmission power thereof.

Note, by the way, that, in addition to the RT count returned by the sensor, it may be useful for the AP 32 to be provided with the amount of time that the sensor had been awake prior to providing a response. This way, transmissions by the AP 32 to the sensor while the sensor is sleeping will not be counted as bad transmissions. For example, if count is twelve and RT is one, the awake time value returned by the sensor may indicate that the sensor was sleeping during the first ten transmissions by the AP 32. This should be taken into account when determining data link quality. In an embodiment herein, the value of COUNT may be adjusted prior to the step 285 in order to compensate for transmissions by the AP 32 while the sensor was sleeping.

Figure 11:
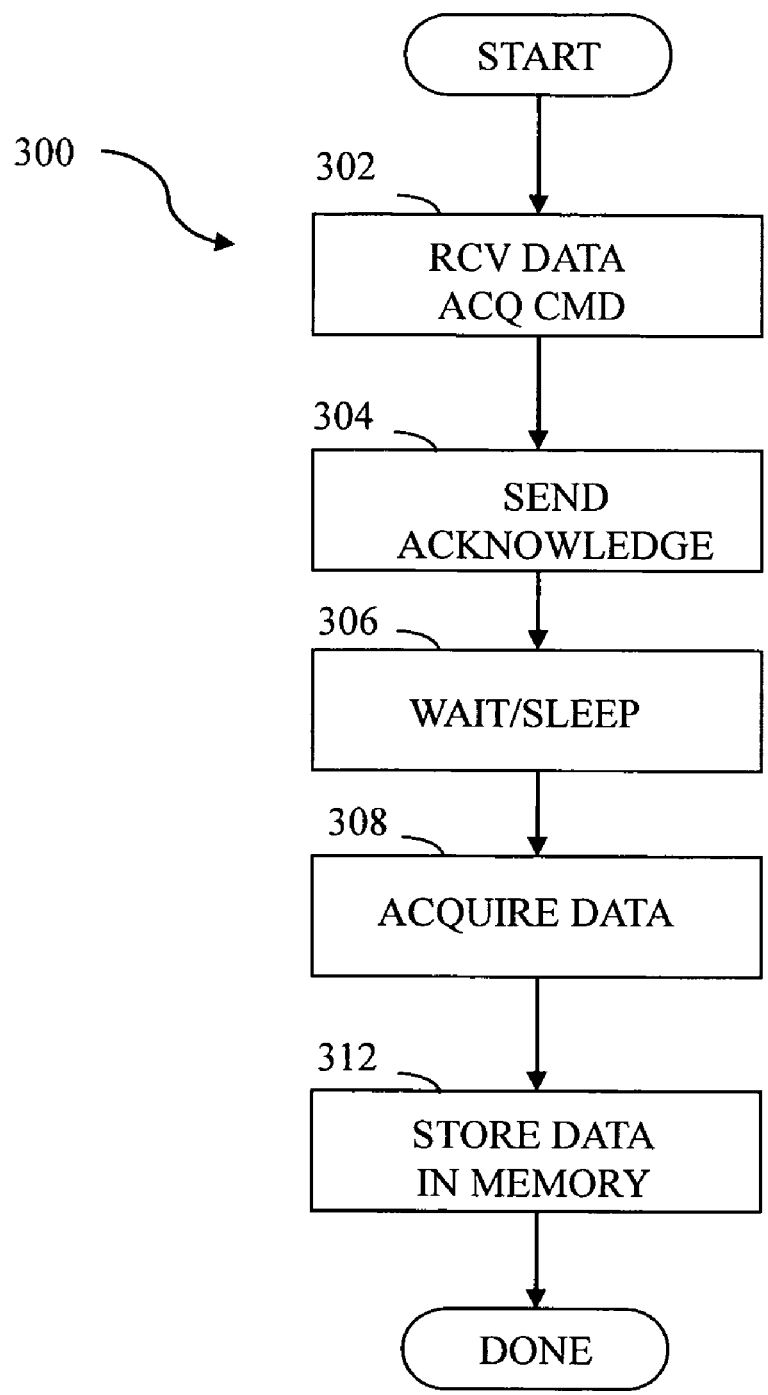
FIG. 11 is a flow chart illustrating processing performed by a sensor in connection with handling a data collection request according to an embodiment of the system described herein.

FIG. 11 shows a flow chart 300 that illustrates steps performed by a sensor in connection with receiving a command from the AP 32 to collect data at a particular time. Processing begins at a first step 302 where the sensor receives the command. Following the step 302 is a step 304 where the sensor sends an acknowledgement back to the AP 32. Note that receiving the data and sending an acknowledgement at the steps 302, 304 may be performed according to the processing illustrated by the flow chart 200. Following the step 304 is a step 306 where the sensor waits/sleeps until it is time to collect the data. In some embodiments, the sensor may always wait without sleeping. In other embodiments, the sensor puts itself to sleep for the necessary amount of time. In still other embodiments, the sensor may wait if the collection time is less than a predetermined amount of time in the future and put itself to sleep if the collection time is more than the predetermined amount of time in the future.

Following the step 306 is a step 308 where the sensor acquires the data. Following the step 308 is a step 312 where the sensor stores the data in its memory (for later transmission to the AP 32). Following the step 312, processing is complete. In an embodiment herein, the sensor retains collected data until the AP 32 directs the sensor to collect new data so that if there is any difficulty transmitting the data to the AP 32, the AP 32 can request retransmission. In some instances, the data may be retained only until the sensor receives an indication that all data has been received successfully by the AP 32. Such an indication may be included as a part of a sleep command from the AP 32, or there may be a dedicated command from the AP 32 allowing the sensor to power down part of its memory containing the data to save energy.

Figure 12:
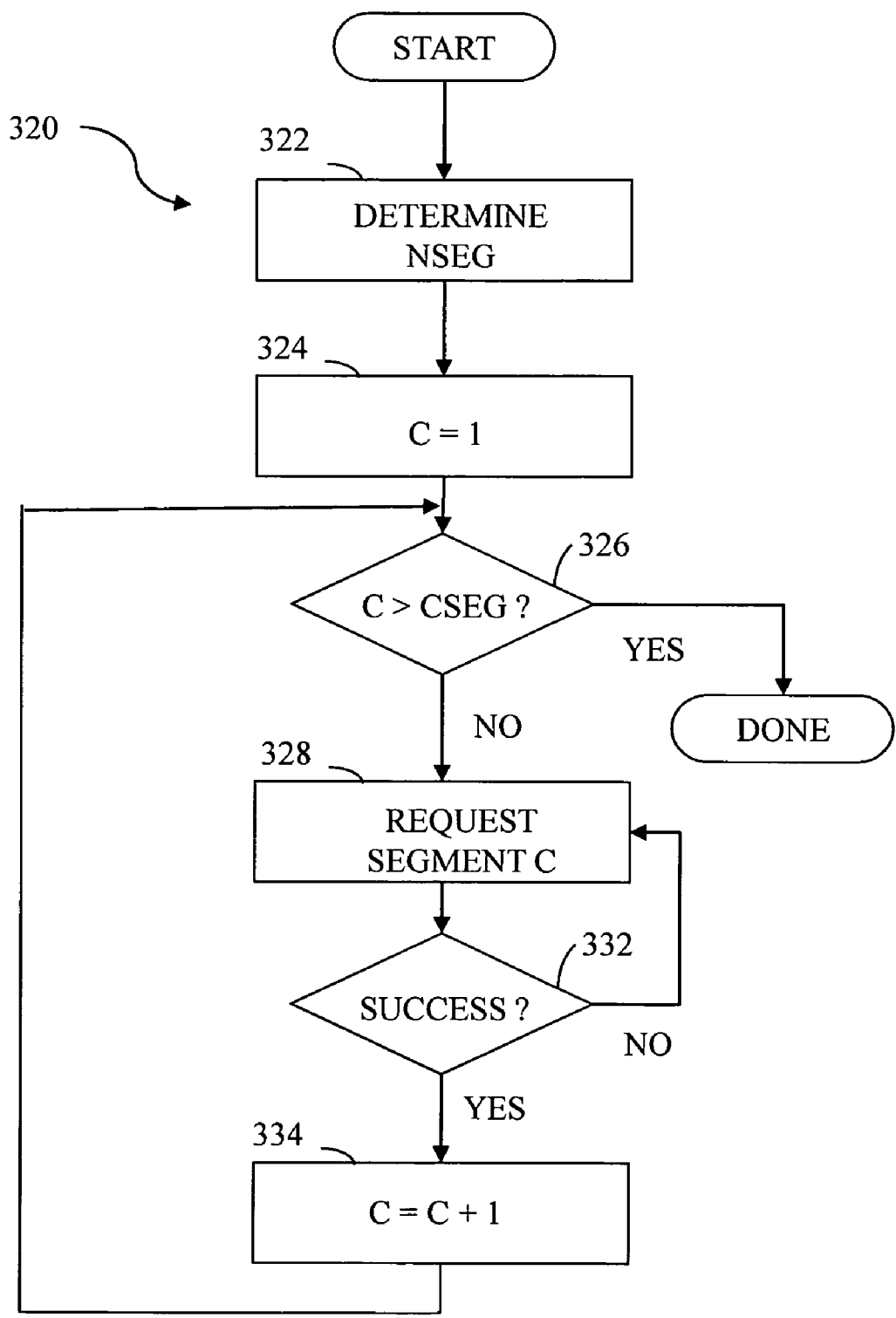
FIG. 12 is a flow chart in connection with an AP requesting collected data from a sensor according to an embodiment of the system described herein.

FIG. 12 shows a flow chart 320 that illustrates steps performed by the AP 32 in connection with obtaining collected data from a sensor. Processing begins at a first step 322 where the AP 32 determines the number of segments (separate packets) that comprise the data. As discussed elsewhere herein, data may be broken into segments and transmitted in separate packets. The determination at the step 322 may include dividing the (expected) total amount of data by the packet size. Following the step 322 is a step 324 where an index variable, N, is set to one. The index variable, N, may be used to iterate through the data packets.

Following the step 324 is a test step 326 where it is determined if the index variable, C, is greater than the number of segments (CSEG). If so, then processing is complete. Otherwise, control transfers from the step 326 to a step 328 where the AP 32 requests that the sensor transmit segment C. Following the step 328 is a test step 332 where it is determined if the AP 32 has successfully received the requested data. If not, then control loops back to the step 328 to request the data again. Note that the steps 328, 332 may be performed according to the processing illustrated by the flow chart 270. If it is determined at the step 332 that the AP 32 has successfully received the requested data, then control transfers from the test step 332 to a step 334 where the index variable, C, is incremented. Following the step 334, control transfers back to the step 326 for another iteration.

According to the system described herein, the sensor node electronics may be put into a low-energy sleep state between signal acquisitions in order to conserve battery. The circuitry being switched off may include the high resolution timers used by the sensor's microcontroller (e.g., processor 44 of sensor 34). The sleep-wake cycle may be monitored by a real-time clock external to the microcontroller, operating at resolution and accuracy not sufficient for vibration monitoring uses. For example, the real-time clock used for wake-up purposed may operate with 1 second accuracy, while the required clock synchronization accuracy may be below 1 ms range. Therefore, when a sensor node wakes up, it may be necessary to rapidly synchronize it to the rest of the system (i.e. the access point node needs to calculate the sensor node's relative clock offset) and that the synchronization be done "from scratch"—i.e., without using prior timing data. Also, it may be desirable that synchronization be done with as few message exchanges as possible, so that the energy use is minimized. For example, assume that the roundtrip time for timestamp message exchange is 40 ms. Then, exchanging 50 message pairs with 4 vibration sensors will take at least 8 s, assuming no packet losses. This means that a vibration sensor might spend almost as much time waiting to be synchronized as for the actual data acquisition. Reducing the number of timestamp exchanges may save energy and prolong battery life. Accordingly, as further discussed elsewhere herein, the system described herein provides for rapid synchronization of wireless devices that does not require the use of prior timing data.

Figure 13:
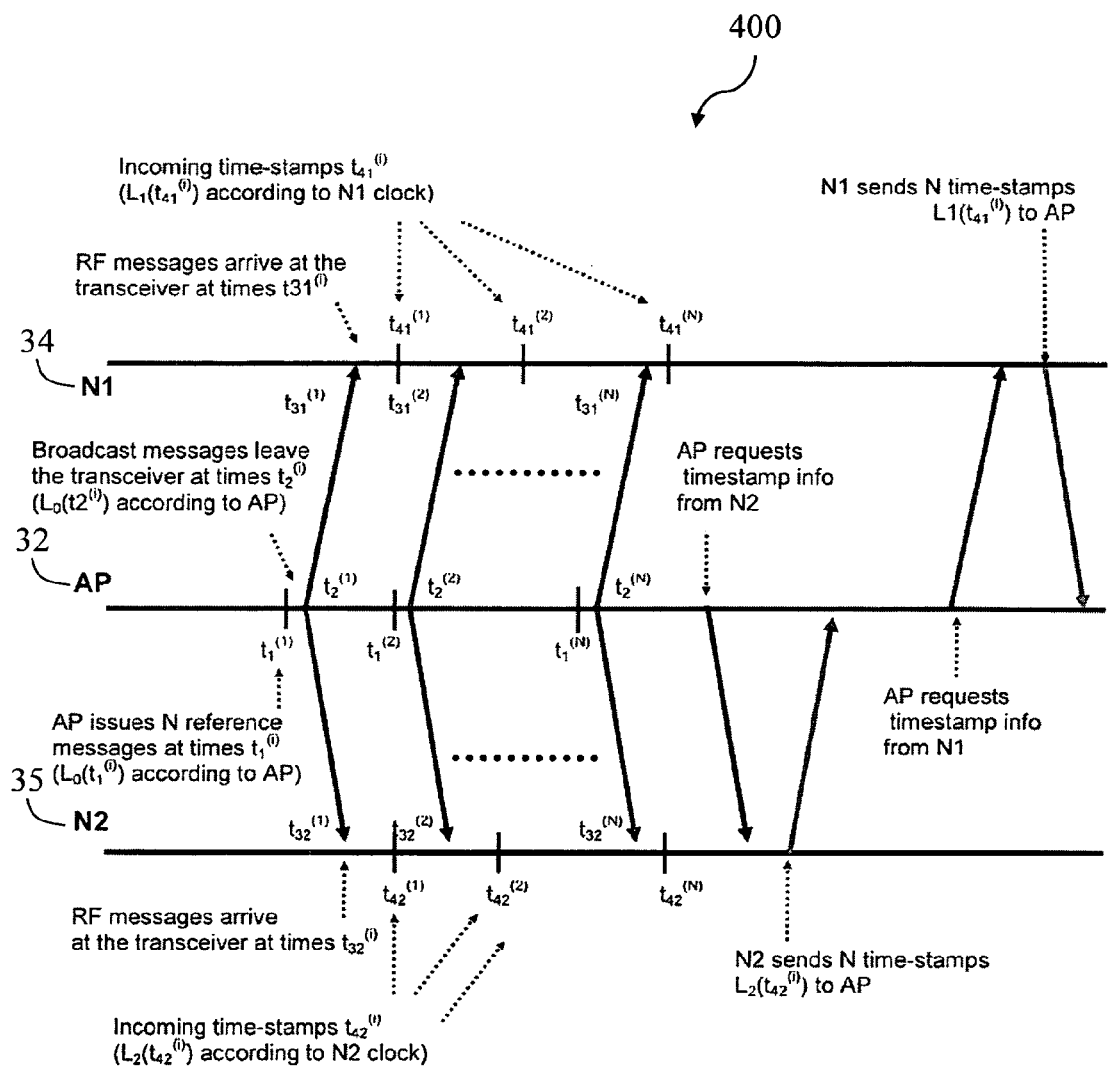
FIG. 13 shows a timing diagram according to an embodiment of the system described herein in connection with the AP, as a control node, broadcasting N reference messages to sensor nodes N1 and N2.

FIG. 13 shows a timing diagram 400 according to an embodiment of the system described herein in connection with the AP 32, as a control node, broadcasting N reference messages to sensor nodes N1 and N2 (e.g., sensor nodes 34 and 35). The network of the AP 32 and sensor nodes N1 34 and N2 35 may operate in a star network configuration in which the messages are not exchanged directly between the nodes N1 34 and N2 35. Although the system described herein is discussed principally for two sensor nodes (N1 and N2) and one control node (AP), the system may be extended to more than two sensor nodes and/or more than one control node as appropriate in accordance with desired implementations and performance characteristics. The number N of reference messages may be chosen according to desired operational characteristics and as further discussed elsewhere herein. The messages may be generated by a microcontroller (e.g., processor 62) of the AP 32 at times $t_1^{(i)}$ (for i=1 ... N) and leave a transceiver of the AP 32 at times $t_2^{(i)}$. The messages reach the transceivers of N1 34 and N2 35 at times $t_{31}^{(i)}$ and $t_{32}^{(i)}$, and are handed over to microcontrollers of the nodes N1 34 and N2 35 at times $t_{41}^{(i)}$ and $t_{42}^{(i)}$ respectively.

Following receipt of a broadcast message, both N1 34 and N2 35 may record the respective times of receipt according to their local clocks, $L_1(t_{41}^{(i)})$ and $L_2(t_{42}^{(i)})$ (where $L_{(i)}(t)$ denotes a respective clock reading at a time t), but may refrain from any further actions, including sending any messages to other nodes. Instead, both N1 34 and N2 35 may wait for another reference broadcast or wait for another command from the AP 32. After transmitting N reference broadcast messages, the AP 32 sends to each sensor node a request for timestamp data. The order in which these timestamp requests are sent to particular sensors may be interchangeable without affecting operation of the system. For example, in the diagram 400, first a request is sent to N2 35 and then to N1 34, but a reverse sequence may also be used. It is noted, however, that that the requests may be sent separately so that responses may be sent immediately without risk of a collision. Having received a request, N1 34 and N2 35 send a single message to the AP 32 containing all record timestamps $L_1(t_{41}^{(i)})$ and $L_2(t_{42}^{(i)})$.

After receiving the response from N1 34 and N2 35, the AP 32 is in possession of all timing information and may calculate relative clock offsets between the sensor node clocks. Specifically, after sufficiently many timestamp pairs $L_1(t_{41}^{(i)})$ and $L_2(t_{42}^{(i)})$ are received from N1 and N2, the AP 32 may calculate a collection of individual clock offset estimates $O^{(i)}_{12} = L_1(t_{41}^{(i)}) - L_2(t_{42}^{(i)})$. Then, the set of individual estimates $O^{(i)}_{12}$ may be used to calculate the overall clock offset estimate. This may be done using any of a number of well-known methods, including arithmetic mean, median, or their trimmed versions (with outliers rejected).

After the AP 32 has calculated the relative clock offsets between the two sensor nodes 34, 35, the AP 32 may send resulting information back to N1 34 and N2 35, possibly within another broadcast message. Then, both sensor nodes may use the resulting offset calculation information to convert any time information in future commands from the AP 32. Alternatively, and/or additionally, an advantageous solution may be to keep the offset information within the AP 32 since the AP 32 may have a higher computational capability than the sensor nodes and may have an unconstrained power supply. Therefore, the AP 32 may be more suitable to perform a majority of the calculations and computations may then be minimized at the sensor nodes 34, 35. The AP 32 may use the estimated relative clock offsets to appropriately adjust the clock values to be included in commands sent to the sensor nodes 34, 35, so that the actions of the sensor nodes 34, 35 correspond to the same physical time instances. For example, when the AP 32 needs N1 34 and N2 35 to acquire sensor data, the AP 32 may command N1 34 and N2 35 to start data acquisition at times $t_{a1}$ and $t_{a2}$, respectively, with $t_{a1}$ and $t_{a2}$ given according to the sensor nodes' local clocks, and chosen so that $t_{a1}-t_{a2}=O_{12}$, where $O_{12}$ is the estimate of the relative offset between those clocks. This way, neither of the sensor nodes 34, 35 needs to be concerned with the issue of how the clock offset estimate is calculated or updated. All that the sensor nodes 34, 35 need to know is the time instants, according to their local clocks, when they are required to perform their actions, such as data acquisition, control signal updates, etc. An advantage of this approach is that the software running on sensor nodes is simplified and resource use is minimized. This may be particularly beneficial if dynamic tracking of clock offset drift is also needed, which may require significant computational effort and which is further discussed elsewhere herein.

In a practical situation it may happen that some of the messages may be lost. To accommodate possible losses of reference broadcast messages from the AP 32 to the sensor nodes 34, 35, each broadcast message may include an identifier (e.g. a serial number) so that when N1 34 and N2 35 send back the timestamp results, each timestamp value may be accompanied by the identifier of the corresponding reference broadcast. Then, the AP 32 may easily match the timestamp pairs coming from N1 34 and N2 35 and determine if an additional round of reference broadcasts may be needed for sufficiently accurate clock offset estimation.

Figure 14:
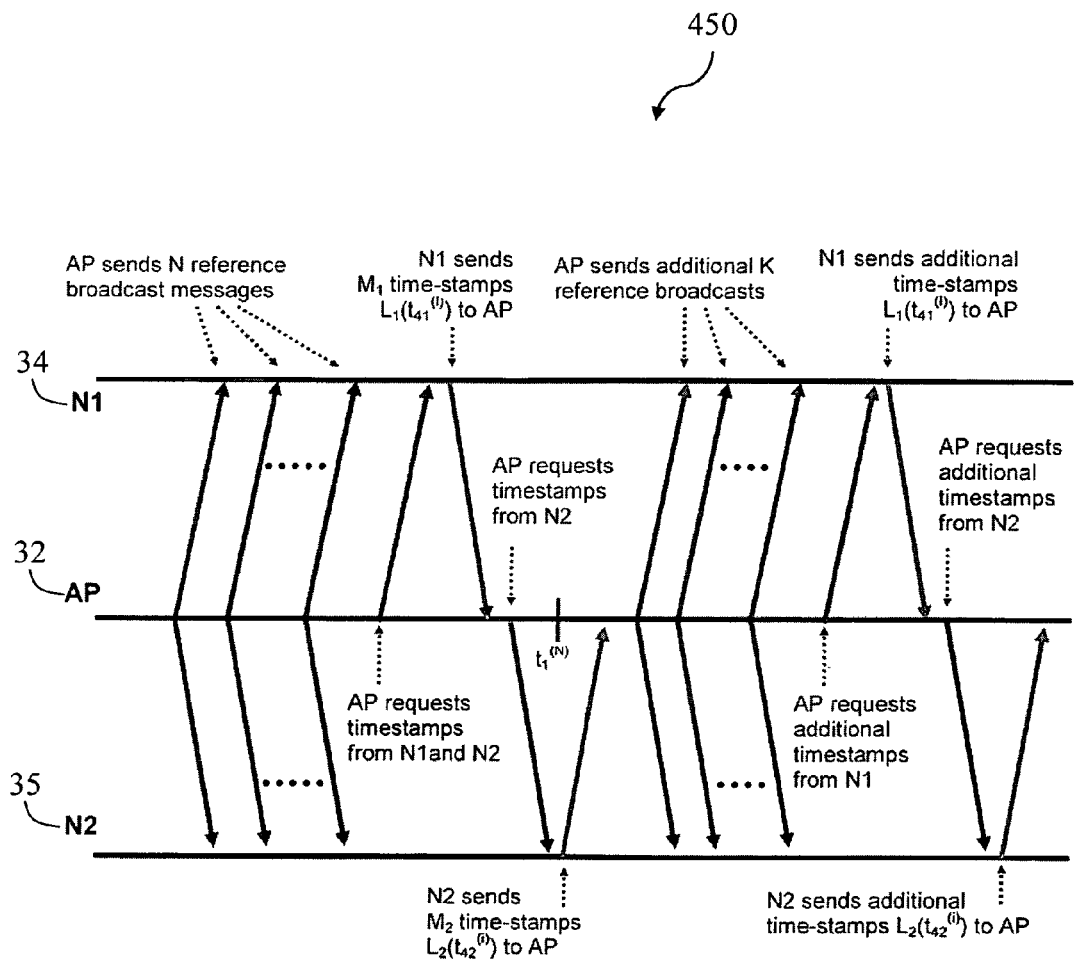
FIG. 14 shows a timing diagram that illustrates an algorithm variant in which an additional round of reference broadcasts is used in case of unexpected message losses.

FIG. 14 shows a timing diagram 450 that illustrates an algorithm variant in which an additional round of reference broadcasts is used in case of unexpected message losses. Suppose that after sending N reference broadcast messages, the AP 32 receives $M_1$ timestamp values from N1 34 and $M_2$ timestamp values from N2, and establishes that M timestamp pairs may be used for clock offset estimation. Typically, M will be smaller than either $M_1$ or $M_2$, because not the same broadcast messages may be lost on the AP-$N_1$ and AP-$N_2$ propagation paths. If the AP 32 determines that M is too small a number for accurate estimation of the relative clock offset between N1 and N2, then a second round of synchronization may follow, with K additional broadcast messages sent to both sensors. The AP may choose the number K in such a way that K>N−M, to make sure that at least N valid timestamp pairs are received from both sensor nodes. To determine the proper value of K, the AP may estimate the message loss rate as (N−M)/N and choose the number K such that K>(N−M)*N/M. Other approaches to determine the number K are also possible.

It may be noted that if fewer than desired timestamp pairs arrive from N1 and N2 in the second round, additional rounds may be needed. To prevent the need for such iterations, the original number N of broadcast messages may be chosen in such a way that even with the expected message loss rate the AP 32 will receive sufficiently many timestamp pairs. On the other hand, when message loss rate is variable in time, it may not be always necessary to send too many reference broadcasts, as this may lead to unnecessary energy use. In such cases, it may be preferred to adjust the number of broadcast messages as needed according to the currently observed message loss rate, starting with the nominal number N.

The variant with multiple synchronization rounds may also be advantageous if variation between the individual clock offset estimates $O^{(i)}_{12}=L_1(t_{41}^{(i)})-L_2(t_{42}^{(i)})$ is unpredictable or changing throughout the system's operation. Then, the required number of samples necessary for an accurate estimate may not be a priori known, and may require on-line adjustments. Then, the initial number N may be chosen based on the nominal expected variation of $O^{(i)}_{12}$, and then additional K broadcast messages may be sent to reach the desired accuracy. Known techniques for selection of an appropriate sample size depending on the observed sample variance may be used. Further, message losses affecting timestamp requests and timestamp responses may be addressed using known retransmission approaches.

In situations where synchronization accuracy is required, it may be necessary to estimate the relative clock drift, i.e. to model the relative clock offset as a function of time. This may be particularly useful if the clock offset information is used to schedule actions, such as data acquisition, that may be removed in time with respect to the synchronization process. In an embodiment, linear dependence on time may be assumed, and the clock drift rate may be estimated in addition to the instantaneous clock offset using known clock drift estimating techniques based on a number of individual clock offset observations. For example, a typical 100 ppm clock drift rate over 2 s time interval would give a 0.2 ms synchronization error without using the correction techniques described herein. It is noted that the system described herein may also be used and operate in connection with non-linear dependence of clock drift over time. It is further noted that the clock drift does not need to be expressed as a function of the AP 32's own time, but may be referenced to the local clock of either N1 34 or N2 35. This way, the message processing time jitter at the AP 32 may not influence the drift estimation accuracy.

Accurate drift rate estimation may require a larger collection of timestamp pairs than offset estimation alone. On the other hand, the AP 32 may use previous drift rate estimates from previous synchronization cycles. Differences in clock rates between N1 34 and N2 35 may be approximately constant, or very slowly varying, between consecutive sensor wake-ups, even if both clocks may be reset at random time instances. So at the next synchronization round, the AP 32 may reuse the previous drift rate estimate and update only the clock offset estimate. Alternatively, a long-term tracking algorithm, such as Kalman filter, may be used to track slow changes of the drift rate, using both the previous information and the new data from the most recent synchronization cycle.

The AP 32 may initiate a synchronization cycle according to the system described herein whenever the AP 32 predicts that N2 35 will be required to perform a synchronous action (such as data acquisition) with N1 34 (or vice versa). To start the process, the AP 32 may first establish that N1 34 and N2 35 are both awake. This may be based on the current time, assuming that the AP 32 knows the sleep-wake schedule of N1 34 and N2 35, with the AP 32 controlling or at least monitoring most of sensor nodes' activities. Note that if the system is intended for synchronous data acquisition, then it may be desirable to have N1 34 and N2 35 scheduled to wake around the same time to make synchronization possible. Additional time margin may be added after the predicted wake up times of N1 34 and N2 35, to account for possible inaccuracies of wake up timers, random delays in wake-up process etc. Alternatively, the AP 32 may periodically poll N1 34 and N2 35, requesting their status, and when responses have arrived indicating that N1 34 and N2 35 are active, then the synchronization process may be started. A combination of both approaches may be also used, with the AP 32 starting to poll N1 34 and N2 35 for status only after N1 34 and N2 35 are close to their expected wake-up moments. In the case when no synchronous action will be required from N1 34 and N2 35, there may be no need for rapid resynchronization, and the AP 32 may command N1 34 and N2 35 to enter a sleep state. Otherwise, the AP 32 may start the synchronization cycle after establishing that both N1 34 and N2 35 are active.

It should be noted that consecutive reference broadcast messages sent by the AP 32 may need to be spaced appropriately to make sure that each of the sensor nodes 34, 35 has no other tasks to perform when a reference message arrives. In this way, errors corresponding to random processing delays on each sensor node may be minimized. When a reference message is handed over by the transceiver 46 to the sensor node's processor 44, it may be desirable that the processor 44 applies the timestamp as soon as possible (see FIGS. 2A and 4). This may require that processing of any previous reference messages has been completed. For this reason, the AP 32 may implement a sufficiently long waiting period between the consecutive broadcast messages. On the other hand, this delay should be as short as practical to limit the overall duration of the synchronization procedure in order to minimize the energy use. Reasonable upper bounds for one-way transmission time may be estimated.

Figure 15A:
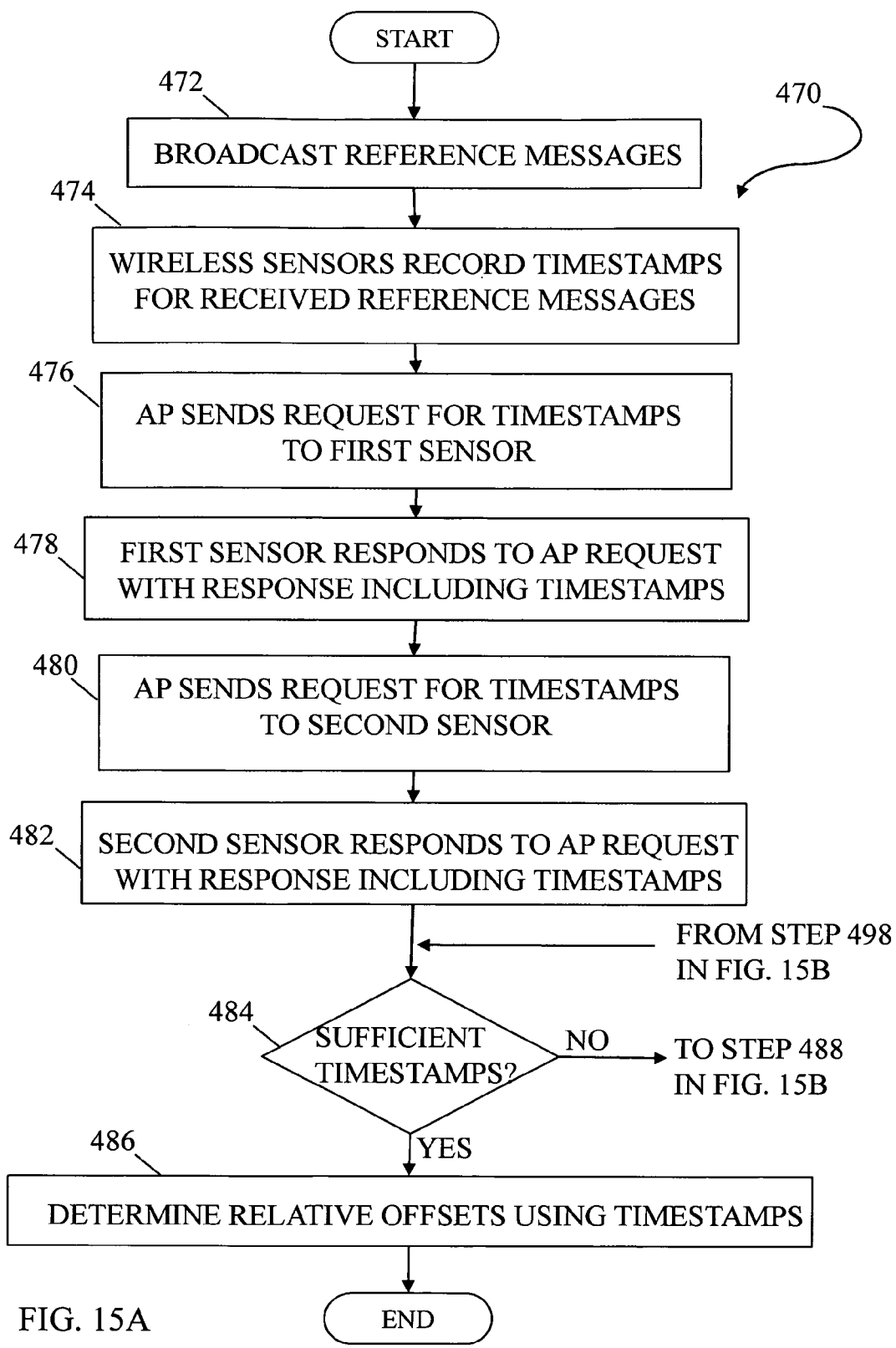
FIGS. 15A and 15B show a flow diagram for an algorithm according to an embodiment of the system described herein for achieving synchronization using the broadcasting of reference messages from the AP.
Figure 15B:
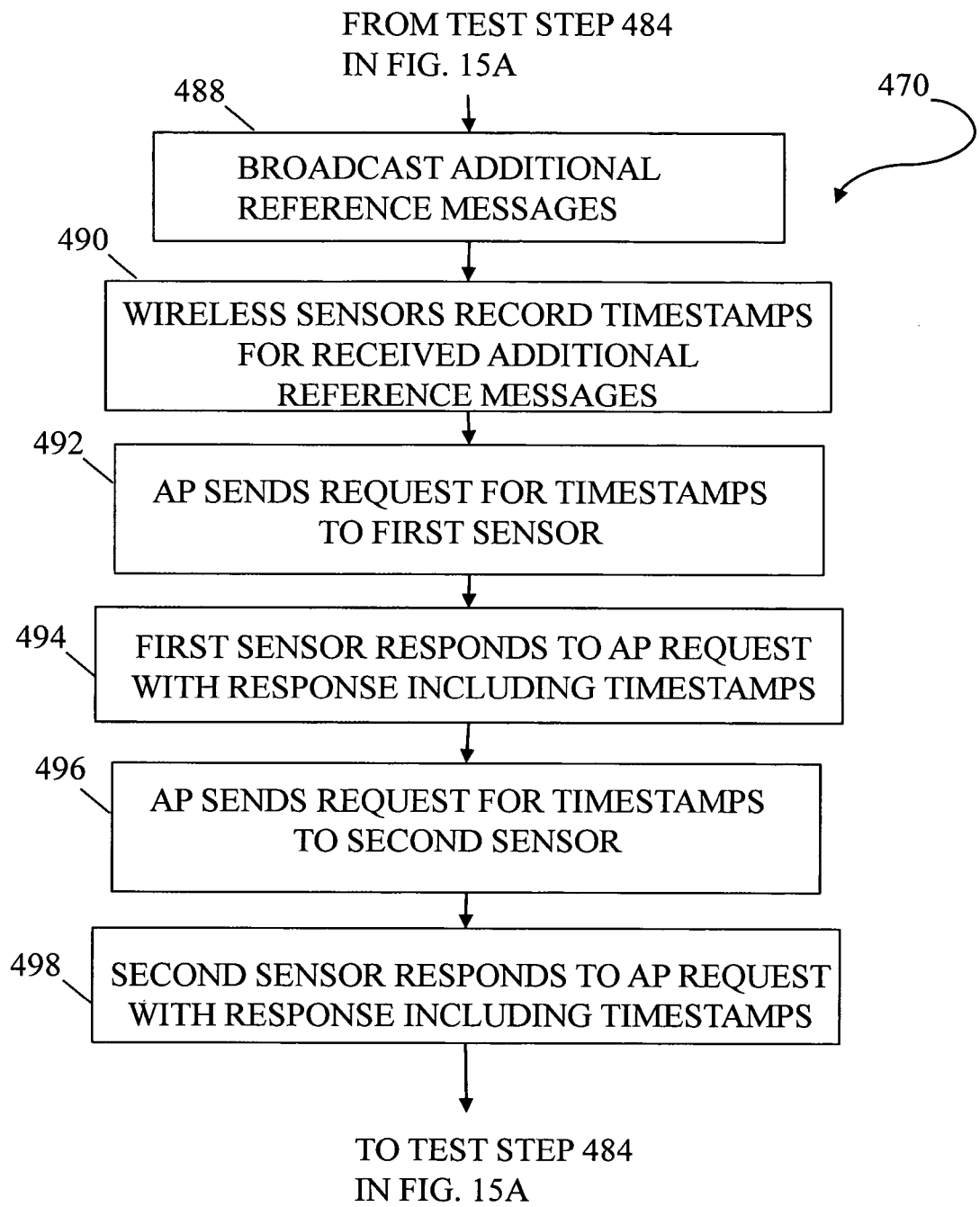

FIGS. 15A and 15B show a flow diagram 470 for an algorithm according to an embodiment of the system described herein for achieving synchronization using the broadcasting of reference messages from the AP 32. The number of reference messages (e.g., N messages) broadcast may be determined as further discussed elsewhere herein. At a step 472, a first set of multiple reference messages are sent from the AP 32 to each of the plurality of wireless sensors N1 34, N2 35. After the step 472, processing proceeds to a step 474, where, at each of the wireless sensors 34, 35, a timestamp is recorded corresponding to each of the reference messages that is received. After the step 474, processing proceeds to a step 476 where the AP 32 sends a request to the first sensor N1 34 requesting the timestamps corresponding to the broadcast reference messages received by the first sensor N1 34 ($M_1$ timestamps). After the step 476, processing proceeds to a step 478 where the first sensor N1 34, in response to the request from the AP 32, sends a response to the AP 32 that includes the timestamps corresponding to the reference messages received by the sensor N1 34.

After the step 478, processing proceeds to a step 480 where the AP 32 sends a request to the second sensor N2 35 requesting the timestamps corresponding to the broadcast reference messages received by the second sensor N2 35. After the step 480, processing proceeds to a step 482 where the second sensor N2 35, in response to the request from the AP 32, sends a response to the AP 32 that includes the timestamps corresponding to the reference messages received by the sensor N2 35 ($M_2$ timestamps).

After the step 482, processing proceeds to a test step 484 where the AP 32 determines whether a sufficient number of timestamp pairs ($M_1$ and $M_2$) have been received from the sensors N1 34, N2 35. As further discussed elsewhere herein, an insufficient number of timestamp pairs may result from loss of reference messages. If sufficient timestamp pairs have been received by the AP 32, then processing proceeds to a step 486 where the AP 32 determines the relative clock offsets between each of the sensors N1 34, N2 35 using the timestamp pairs ($M_1$ and $M_2$). It is noted that although two sensors are discussed above with respect to above-noted algorithm, the algorithm may be extended to more than two sensors. After the step 486, processing is complete.

If at the test step 484, it is determined that sufficient timestamp pairs have not been received, then processing proceeds to a step 488 where an additional set of reference broadcast messages may be sent by the AP 32 to each of the sensors N1 34, N2, 35. The number of additional reference messages (e.g., K messages) broadcast may be determined as further discussed elsewhere herein. After the step 488, processing proceeds to a step 490, where, at each of the N1 34, N2 35, a timestamp is recorded corresponding to each of the additional reference messages that is received. After the step 490, processing proceeds to a step 492 where the AP 32 sends a request to the first sensor N1 34 requesting the timestamps corresponding to the additional broadcast reference messages received by the first sensor N1 34. After the step 492, processing proceeds to a step 494 where the first sensor N1 34, in response to the request from the AP 32, sends a response to the AP 32 that includes the timestamps corresponding to the additional reference messages received by the sensor N1 34.

After the step 494, processing proceeds to a step 496 where the AP 32 sends a request to the second sensor N2 35 requesting the timestamps corresponding to the additional broadcast reference messages received by the second sensor N2 35. After the step 496, processing proceeds to a step 498 where the second sensor N2 35, in response to the request from the AP 32, sends a response to the AP 32 that includes the timestamps corresponding to the additional reference messages received by the sensor N2 35. After the step 498, processing proceeds back to the test step 484.

An advantage of the above-noted embodiment is that synchronization between the AP 32 and the sensor nodes 34, 35 may be avoided. Nevertheless, in practical operation of a sensing system according to that described herein, the AP 32 may perform a rough estimation of the offset of the sensor nodes 34, 35 relative to the AP 32's own clock. For example, when the AP 32 is about to request data acquisition from a number of sensors, it may be desirable that not only does the AP 32 make sure that the starting clock values sent to all sensors correspond to the same physical time instant, but further that the AP 32 make sure that the requested time lies indeed in future, but not too far in future, to avoid excessive waiting. The AP 32 may also have an approximate idea when the sensor nodes 34, 35 will complete their data collection so that the AP 32 can request transmission of the acquired data (an alternative approach of having sensors announce completion of data collection themselves may potentially lead to possible message collisions). For these reasons, the AP 32 may estimate the clock offsets $O_{01}$ and $O_{02}$ between the AP 32's own clock and those of N1 34 and N2 35. Fortunately, accuracy of this estimation need not be as good as that for the relative clock offset $O_{12}$, particularly if all sensors in the system are wireless and synchronized as described herein.

According to an embodiment of the system described herein, sensor-to-AP offset estimation may be performed by calculating a number of individual estimates $O^{(i)}_{01}=L_0(t_1^{(i)})-L_2(t_{42}^{(i)})$ and $O^{(i)}_{02}=L_0(t_1^{(i)})-L_2(t_{42}^{(i)})$ based on the recorded transmission timestamps $t_1^{(i)}$) and the receipt timestamps $t_{41}^{(i)}$ and $t_{42}^{(i)}$ received from the sensor nodes 34, 35. Then, these individual estimates may be used to calculate the overall offset estimate, through trimmed or untrimmed mean or median, as described elsewhere herein. Such simplified calculation will not be precisely accurate, as it ignores effects of the propagation and processing delays $t_{41}^{(i)}-t_1^{(i)}$, and effectively assumes that the three time instances are equal, i.e. $t_{42}^{(i)}=t_{41}^{(i)}=t_1^{(i)}$. On the other hand, the resulting error may be easily bounded from above, particularly if outlier rejection is used to eliminate unusually long processing times. Then, the AP 32 may add an additional safety margin to the resulting offset estimates to make sure that the scheduled sensor node actions lie always in future, or that all sensors have finished their data collection before data requests are sent.

An alternative solution for the concurrent sensor-to-AP clock offset estimation is to use the timestamp requests and responses in a quadruple timestamp-based receiver-sender synchronization approach, as described elsewhere herein. In this approach, the AP 32 and the appropriate sensor node may attach an additional four timestamps to each request-receive message pair after each reference broadcast message round. As discussed elsewhere herein, accuracy of such estimation based only on one or two timestamp exchanges may be worse than the sensor-to-sensor broadcast-based synchronization. However, it may be sufficient in practice if additional appropriate safety margins are used in calculation of future event times.

The system described herein may also operate to address issues involving packet propagation delays. It is noted that the following discussion is explained principally in connection with an AP and one sensor node (N1); however, the embodiment may be extended to more than one sensor node (e.g., N1, N2 etc.) and more than one AP according to desired operation of a system.

Figure 16:
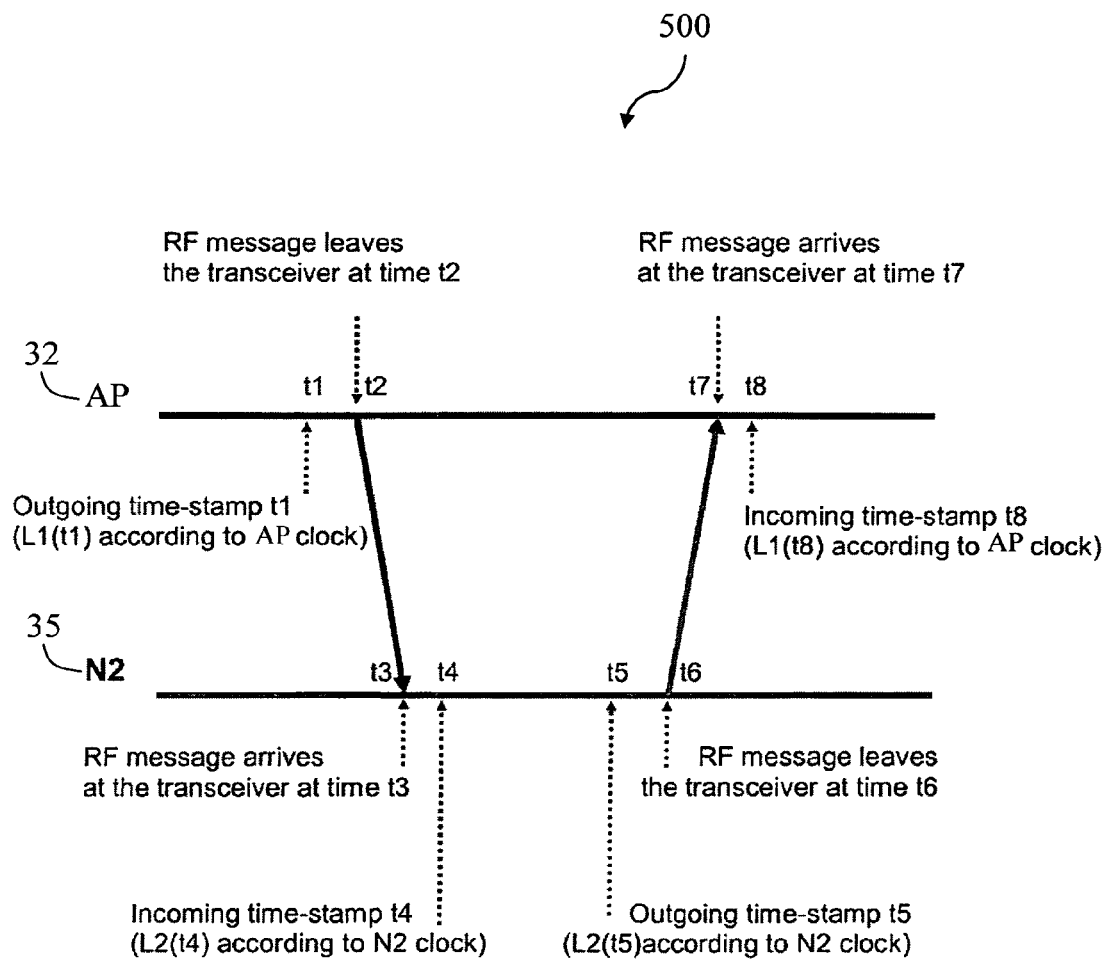
FIG. 16 is a timing diagram showing time stamping of messages exchanged between two devices (the AP and the sensor node N2) in connection with an embodiment of the system described herein to address issues of accurate synchronization between the AP and individual sensors

FIG. 16 is a timing diagram 500 showing time stamping of messages exchanged between two devices (the AP 32 and the sensor node N2 35) in connection with an embodiment of the system described herein to address issues of accurate synchronization between the AP 32 and individual sensors. When the AP 32 sends a message to the N2 35 at time instant $t_1$, the AP 32 reads its own internal clock, and attaches the reading $L_1(t_1)$ to the message payload. If there were no propagation delays, then, upon receiving the message, N2 35 could adjust its clock to the value $L_1(t_1)$. However, by the time N2 35 receives the message, the AP 32 clock no longer reads $L_1(t_1)$. The delay in time between the sending and receiving a message includes time for processing the data packet the transmitter, actually transmitting it through radio waves, and then processing it at the receiver. Data processing may additionally include time for communication between the wireless transceiver component and the microcontroller component of the sensing device. The propagation delay may also include time for possible retransmissions in case of packet losses. Those delays are a priori unknown. To estimate and eliminate the effects of these delays, both nodes exchange messages that are time-stamped at sending as well as at reception.

In the first step of the two-message exchange, the AP 32 attaches an outgoing time stamp $L_1(t_1)$ to the message that is about to be sent to N2 35. Then, N2 35 applies its incoming time stamp $L_2(t_4)$ to the received message, according to N2 35 clock. Note that the time stamp difference $L_2(t_4)-L_1(t_1)$ includes a true (absolute) elapsed transmission time $t_4-t_1$ and the offset between the two clocks. These two time stamp values are retained and then attached to the next message from N2 35 to the AP 32, whenever it is going to be sent. When this happens, N2 35 will also attach the outgoing time stamp $L_2(t_5)$. Thus, the message from N2 35 to the AP 32 will contain in its payload, in addition to any other information, the timestamp $L_2(t_5)$ corresponding to the current message, and two time stamps $L_1(t_1)$ and $L_2(t_4)$ corresponding to the most recent message from the AP 32 to the N2 35. Finally, when the message is received by the AP 32, the fourth time stamp $L_1(t_8)$ is recorded. Thus, upon receipt of the response from N2 35, the AP 32 is in possession of four time stamp values: $L_1(t_1), L_2(t_4), L_2(t_5)$ and $L_1(t_8)$. These four values may allow an estimation of the instantaneous offset between the two clocks, e.g., according to the formula:

$$O^{(i)}=(L_1(t_8^{(i)})+L_1(t_{1(i)})-L_2(t_4^{(i)})-L_2(t_5^{(i)}))/2.$$

However, the above simple estimation assumes that the physical radio packet propagation times in both ways are the same, and that transmission delays, reception delays and processing delays are similar at both nodes. Furthermore, a simple estimation assumes that the rates of both clocks are close and the instantaneous offset between the two clocks does not change appreciably throughout the two message exchange. However, in practice, significant estimation errors may be caused by delay times not being uniform and varying randomly and/or may be caused by other delay factors (particularly using certain off-the-shelf wireless cards), and therefore require large numbers of time-stamped messages to attempt to provide more accurate estimations. Additionally, correlation of consecutive clock offset estimates containing errors may also produce substantial errors in resulting clock offset estimates. Accordingly, the system described herein provides techniques to address the above-noted issues of clock offset estimate errors including de-correlating the consecutive offset estimates.

As discussed elsewhere herein, the AP 32 may initiate a synchronization cycle whenever the AP 32 predicts that N2 35 will be required to perform a synchronous action (such as data acquisition) and the AP 32 needs first to establish that N2 35 is awake. In the case when no synchronous action will be required from N2 35, there may be no need for rapid re-synchronization, and the AP 32 may command N2 35 to enter a sleep state. Otherwise, the AP 32 may start the synchronization cycle after it has established that N2 35 is active.

Figure 17:
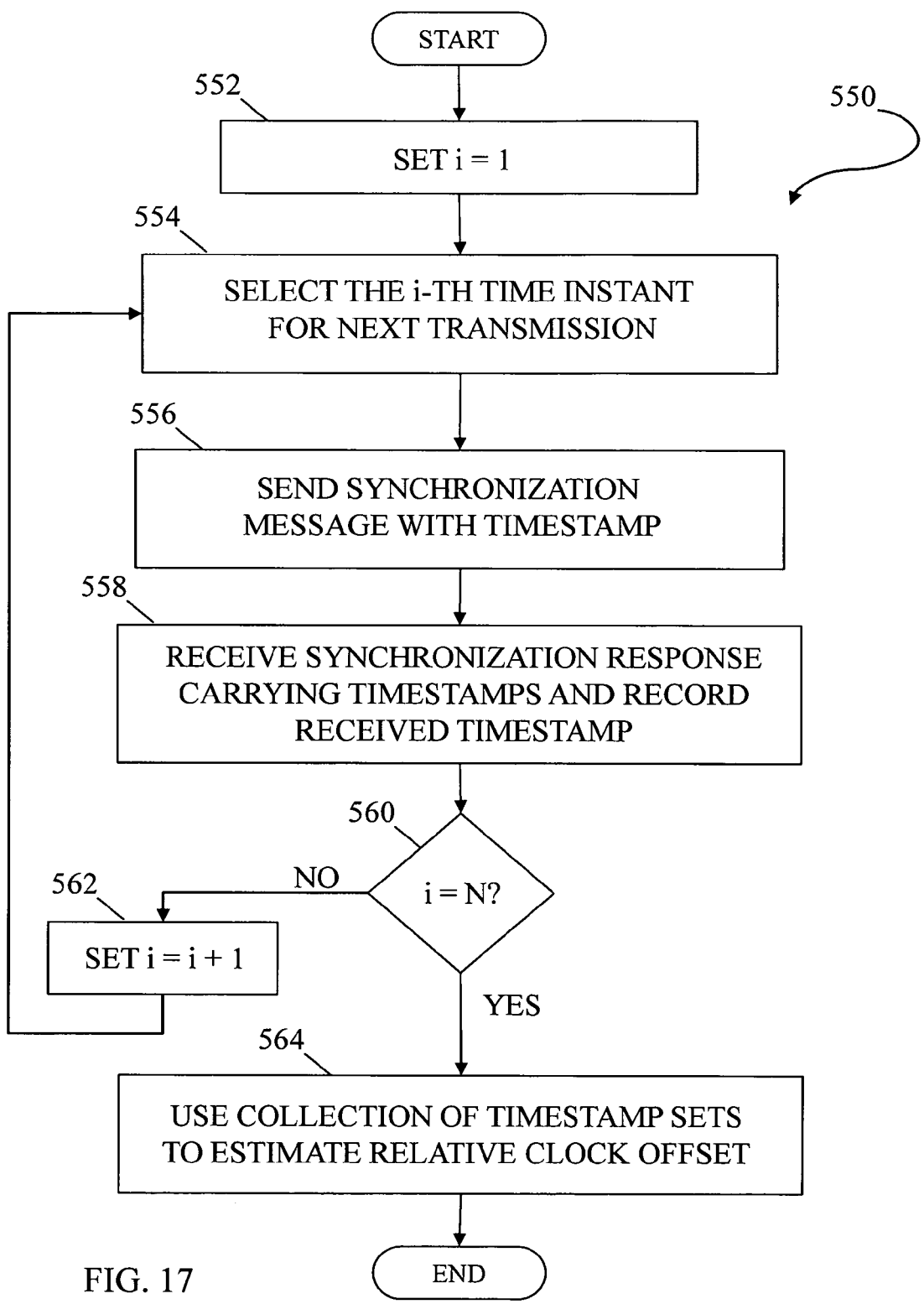
FIG. 17 is a flow diagram showing an algorithm according to the system described herein that may be executed by the AP in connection with estimating relative offsets.

FIG. 17 is a flow diagram 550 showing an algorithm according to the system described herein that may be executed by the AP 32 in connection with estimating relative offsets. At a step 552, for index variable i=1 . . . N, set i=1. After step 552, processing proceeds to a step 554 where the i-th time instant $t_1^{(i)}$ is selected for the next transmission according to at least one timing variants, like that which is further described elsewhere herein. After the step 554, processing proceeds to a step 556 where, at time $t_1^{(i)}$, a synchronization message with timestamp $L_1(t_1^{(i)})$ is sent. After the step 556, processing proceeds to a step 558 where a synchronization response is received from N2 35 that carries timestamps $L_1(t_1^{(i)}), L_2(t_4^{(i)}), L_2(t_5^{(i)})$, and the received timestamp $L_1(t_8^{(i)})$ is noted. After the step 558, processing proceeds to a test step 560 where it is determined if i=N. If i does not equal N, then processing proceeds to a step 562 where i is incremented (i=i+1). After the step 562, processing proceeds back to the step 554. If i is determined to equal N at the test step 560, then processing proceeds to a step 564 at which the collection of timestamp sets $L_1(t_1^{(i)}), L_2(t_4^{(i)}), L_2(t_5^{(i)}), L_1(t_8^{(i)})$, i=1 . . . N, is used to estimate the relative clock offset, as further described below. After the step 564, processing is complete.

The simplified algorithm shown assumes that a synchronization response from N2 35 always arrives. In case of packet losses, a suitable timeout may be implemented at the AP 32, after which the next synchronization message will be sent by the AP 32 to N2 35 even if no response has been received. In an embodiment, to make sure that a suitably large timestamp set is acquired, the loop condition may be tied not to the number of messages sent, but to the number of responses received. Alternatively and/or additionally, to avoid an infinite loop in case of a complete communication breakdown, a maximum number of transmissions may be specified to break the loop even if fewer than N responses were received.

The desired number of message pairs N may be pre-specified based on the required synchronization accuracy and on the predicted probability distribution of transmission times. Alternatively, N may be continually adjusted based on the actually observed variability of instantaneous clock offset estimates. The number of samples to achieve prescribed accuracy may be determined according to standard statistical techniques.

In an embodiment, the system described herein provides for selection of transmission times according to a random distribution. The system described herein addresses and alleviates the problem of possible bias in clock offset estimates due to accidental correlation of transmission times $t_1$ or $t_5$ to either transceiver's $\Delta$ cycle, where the times at which a wireless transceiver hands off received messages to a sensor's processor or to the AP's processor are quantized with a step $\Delta$, which may be known, although the relative shifts of $\Delta$ cycles between the AP 32 and the sensors' transceivers may be a priori unknown. The system described herein provides that, among a finite (and small) set of N message pair exchanges, the average transmission delays $t_4$-$t_1$ and $t_8$-$t_5$ are close to their statistically expected values. This may be achieved by choosing the send time instances randomly, in such a way that correlation with the $\Delta$ cycle is avoided.

Figure 18:
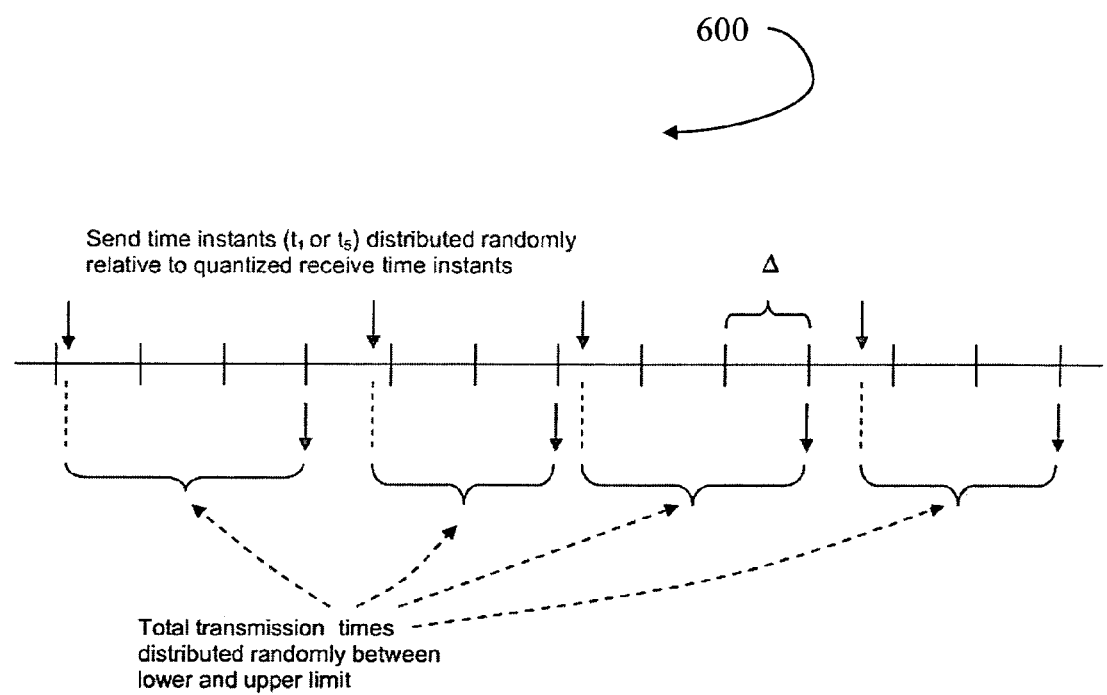
FIG. 18 shows a timing diagram for randomized transmission time instants according to an embodiment of the system described herein.

FIG. 18 shows a timing diagram 600 for randomized transmission time instants according to an embodiment of the system described herein. According to the system described herein, if send times are randomly distributed in a uniform manner relative to boundaries of $\Delta$ intervals, then the resulting transmission delays will be distributed among their expected values. This can be done by delaying the transmit time by a random value distributed uniformly between 0 and $\Delta$.

Figure 19:
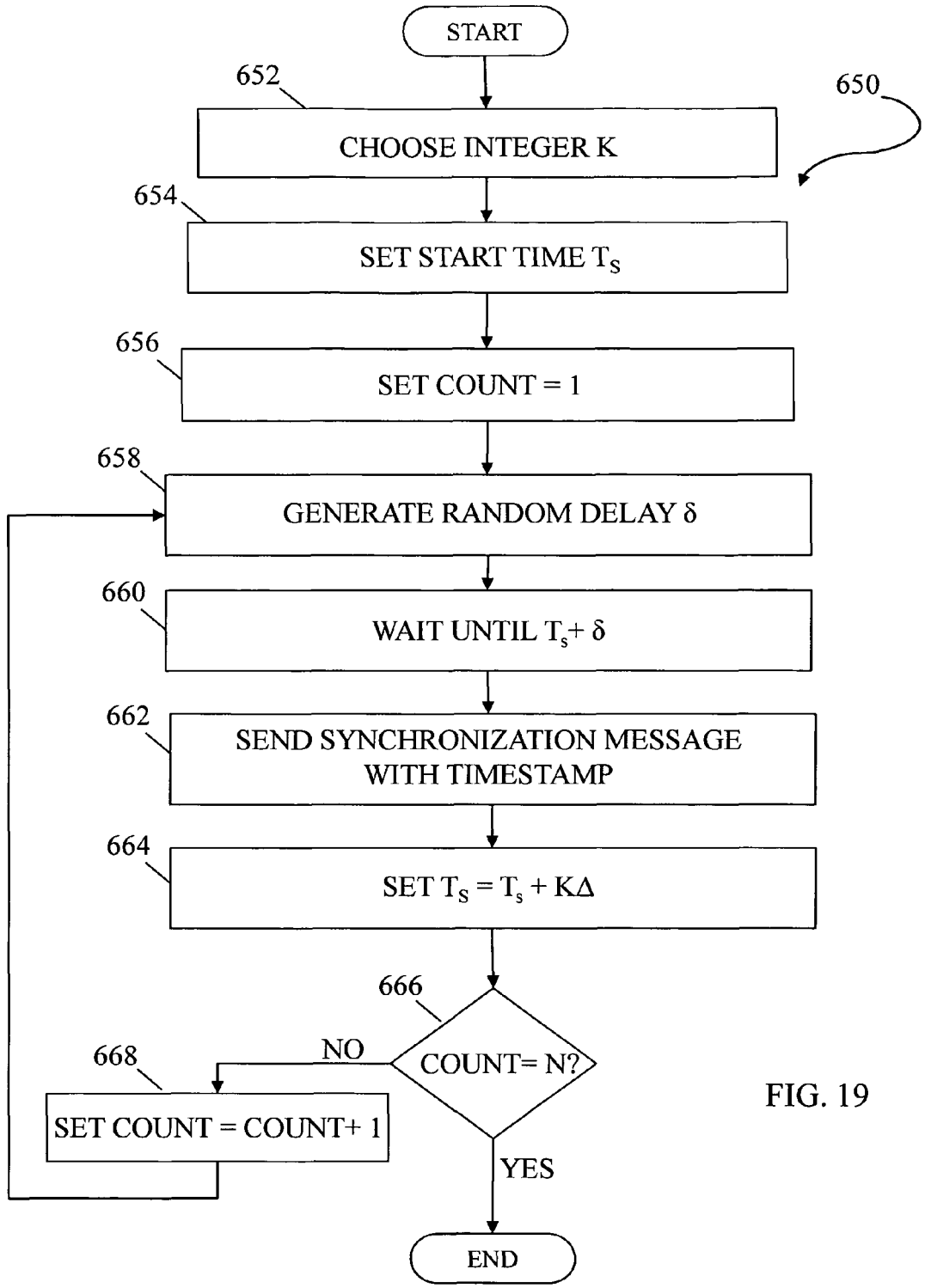
FIG. 19 is a flow diagram showing a timing algorithm for randomized transmission time instances performed on the AP side according to an embodiment of the system described herein.

FIG. 19 is a flow diagram 650 showing a timing algorithm for randomized transmission time instances performed on the AP 32 side according to an embodiment of the system described herein. At a step 652, an integer K is chosen such that K$\Delta$ is greater than the expected worst-case maximum round trip time $t_8$-$t_1$. After the step 652, processing proceeds to a step 654 where the starting time $T_s$ is set. After the step 654, processing proceeds to a step 656 where a counter, COUNT, is set to 1. After the step 656, processing proceeds to a step 658 where a random delay $\delta$ is generated according to a uniform distribution between 0 and $\Delta$. After the step 658, processing proceeds to a step 660 where the AP 32 waits until its internal clock reaches $T_s$+$\delta$. After the step 660, processing proceeds to a step 662 where, at time $T_s$+$\delta$, a synchronization message is sent to N2 35 with a timestamp $L_1(t_1)$ equal to $T_s$+$\delta$. After the step 662, processing proceeds to a step 664 where $T_s$ is set equal to $T_s$+K$\Delta$. After the step 664, processing proceeds to a test step 666 where it is determined if COUNT equals N (the algorithm having been performed N times for N being an integer value that is determined as further discussed elsewhere herein). If COUNT does not equal N, then processing proceeds to a step 668 where COUNT is incremented by 1. After the step 668, processing proceeds back to the step 658. Otherwise, if it is determined that COUNT does equal N at the test step 666, then processing is complete.

It should be noted that while waiting until the next transmission, the AP 32 may, of course, be performing any other necessary tasks, including receiving and time-stamping a response message from N2 35. The reason to wait for at least K$\Delta$ time units between sending two consecutive messages is to make sure that the AP 32 has already received and processed N2's response. The intention is to avoid a situation when the AP 32 is trying to apply two timestamps at the same time. Accuracy of the synchronization procedure relies in part on reducing as much as possible the random elements of processing delays $t_2$-$t_1$ and $t_8$-$t_7$. For this reason, the AP 32 may not have any other tasks to perform when timestamps $L_1(t_1)$ and $L_1(t_8)$ are being applied. If a reply from N2 35 arrived to the AP 32 at the same time when the AP 32 is sending a new message to N2 35, then at least one of the two timestamps may carry an additional error. Waiting at least K$\Delta$ time units allows avoiding such a situation.

On the side of the responding node N2 35, the timing algorithm may be slightly more complicated. If the AP 32 uses the approach outlined above, then the time intervals between arrivals of consecutive synchronization messages at N2 35 would be between (K−1)$\Delta$ and (K+1)$\Delta$. Now, if N2 35 tried to use a fixed delay offset greater than (K+1)$\Delta$, this would invalidate the assumption, used by the AP 32, that the round trip time for a pair of messages is less than K$\Delta$. A solution to this difficulty is to apply the random delay to the moving boundary that is incremented by $\Delta$ as needed.

Figure 20:
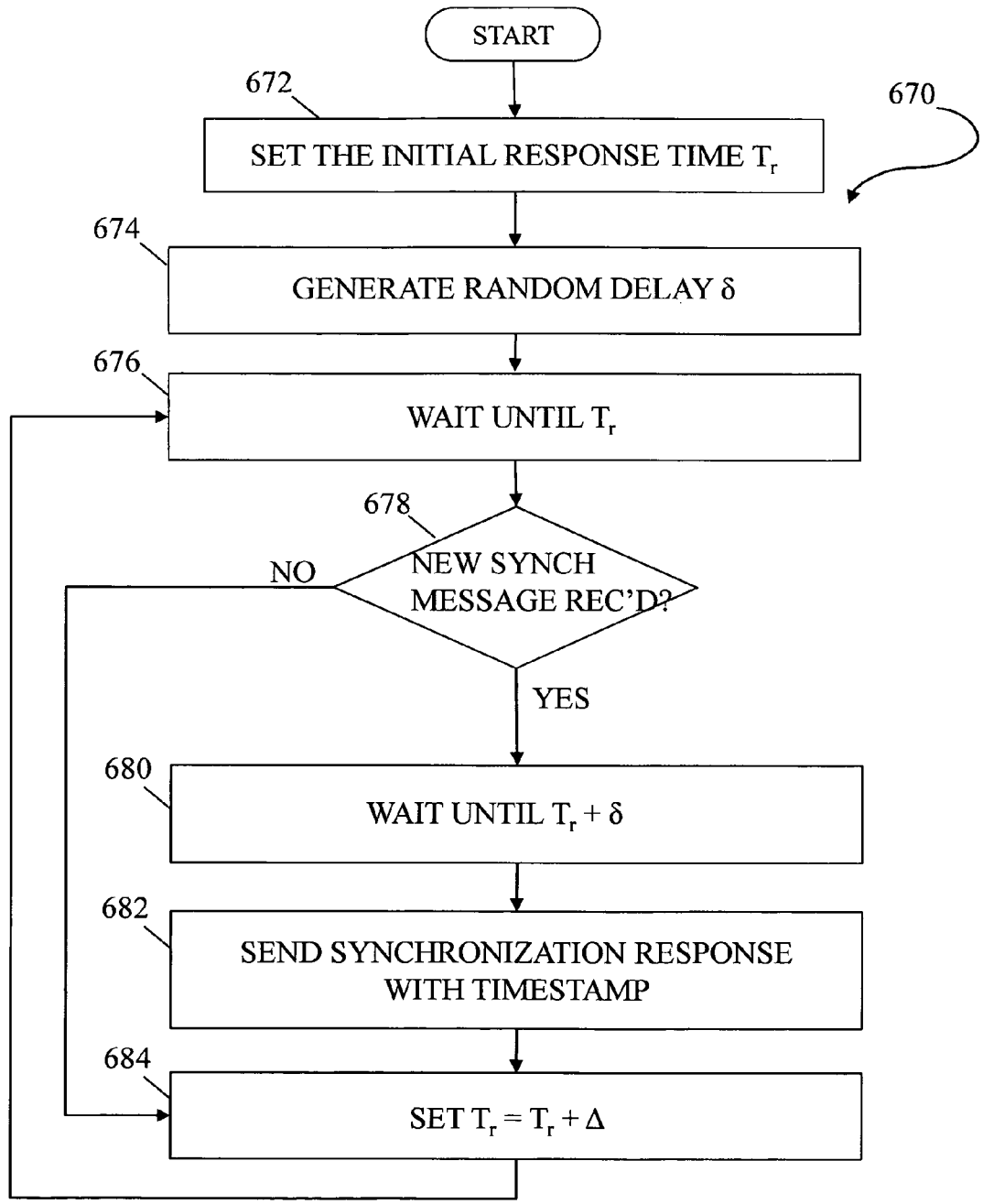
FIG. 20 is a flow diagram showing a timing algorithm for randomized transmission time instances on the sensor node N2 side according to an embodiment of the system described herein.

FIG. 20 is a flow diagram 670 showing a timing algorithm for randomized transmission time instances on the sensor node N2 35 side according to an embodiment of the system described herein. At a step 672, an initial response time $T_r$ is set. After the step 672, processing proceeds to a step 674 where a random delay $\delta$ is generated according to a uniform distribution between 0 and $\Delta$. After the step 674, processing proceeds to a step 676 where the sensor node N2 35 waits until time instant $T_r$. After the step 676, processing proceeds to a test step 678 where the sensor node N2 35 checks if a new synchronization message has arrived from the AP 32. If a new synchronization message has arrived, then processing proceeds to a step 680 where the sensor node N2 35 waits until time instant $T_r$+$\delta$. After the step 680, processing proceeds to a step 682 where, at time instant $T_r$+$\delta$, the sensor node N2 35 sends a synchronization response with timestamp $L_2(t_5)$ equal to $T_r$+$\delta$. After the step 682, processing proceeds to a step 684 where $T_r$ is set equal to $T_r$+$\Delta$. After the step 684, processing proceeds back to the step 676. If at the test step 678 it is determined that a new synchronization message has not arrived from the AP 32, then processing proceeds directly to the step 684.

In an embodiment, some safeguards may be added to the algorithm shown in the flow diagram 670. For example, if the random delay $\delta$ is large and close to $\Delta$, so that the next transmit time Tr+$\delta$ is close to $T_r$+$\Delta$ then by the time synchronization message is sent the clock value may be larger than the next boundary time. In such a case, the new $T_r$ may be set to $T_r$=$T_r$+2$\Delta$ instead. Alternatively, after sending a synchronization response there may be an additional incrementation of the boundary time $T_r$ by $\Delta$ (for this to work, K should be greater than 2).

It should be noted that in the above algorithm N2 35 may be in an infinite loop waiting for messages from the AP 32. In practice, this loop might be broken when the node has already received N synchronization messages. However, this might pose problems if some messages are lost. If data losses occur on the AP-to-N2 path, and the AP 32 may decide not to retransmit, then N2 35 may be waiting for synchronization messages that will never arrive. On the other hand, if the data loss happens on the N2-to-AP path, and the AP 32 retransmits synchronization packets because of lost responses, then N2 35 might not be ready for additional retransmitted synchronization messages. This difficulty may be solved for example by requiring that the AP 32 send a specific 'end-of-synchronization' message at the end of a cycle for N2 35 to break the waiting loop. Similarly, any non-synchronization message, such as data acquisition command, status request, or sleep command, may also be used to bring N2 35 out of the waiting loop.

It may be noted that for random selection of transmission times, in any particular synchronization cycle, the actual times may all be significantly larger or smaller than the expected value. After sufficiently many repetitions, such combinations may become likely. A way to avoid this is to choose N sufficiently large, so that significant deviations from uniform sample distribution are unlikely. If energy saving considerations dictate using small sample sizes N, then an alternative solution may be to distribute transmission times according to a deterministic scheme. Accordingly, another embodiment of the system described herein may provide for selection of uniformly space message transmission times.

Figure 21:
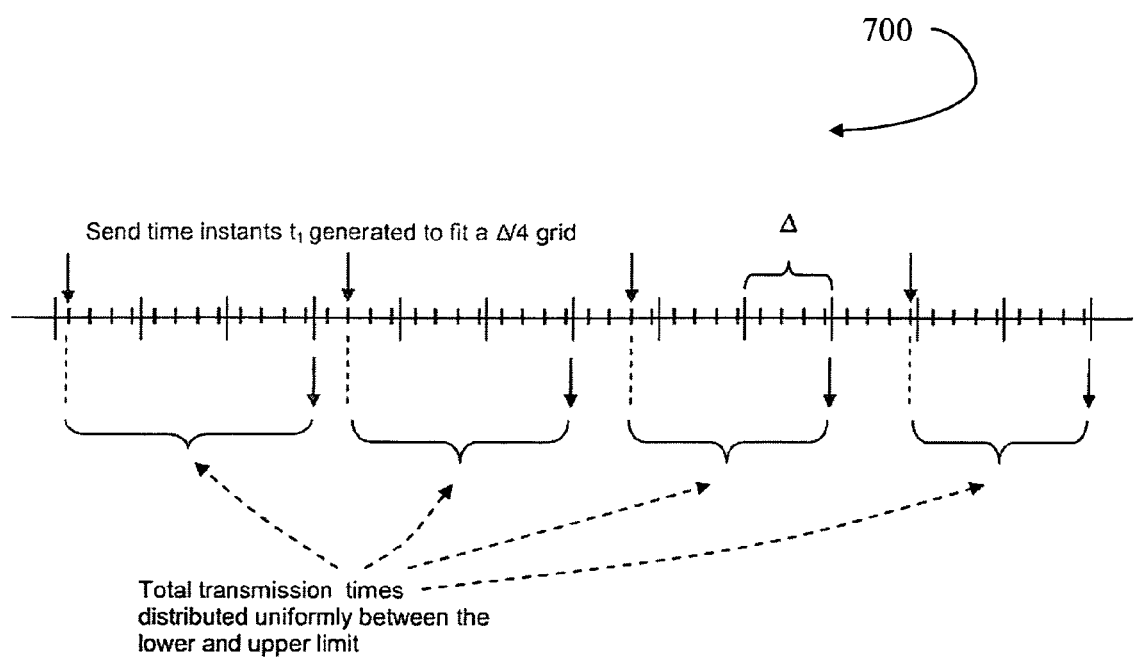
FIG. 21 is a timing diagram showing selection of uniformly spaced message transmission times according to an embodiment of the system described herein.

FIG. 21 is a timing diagram 700 schematically showing selection of uniformly spaced message transmission times according to an embodiment of the system described herein. The main idea of this timing algorithm variant is to make sure that consecutive transmission time instances are shifted with respect to boundaries of the $\Delta$ intervals by increasing fractions of $\Delta$. The diagram below illustrates this idea for the case when intervals between consecutive transmissions increase by $\Delta/4$. Note that the node's processor does not know when the actual $\Delta$ cycle boundaries occur, because it does not have access to the transceiver's internal state. Nevertheless, by shifting transmission delays by a fraction of $\Delta$, it may be assured that the actual transmission times will include values both below and above the expected value. By using a smaller fraction of $\Delta$ a more uniform sample distribution may be obtained. In particular, $\Delta/N$ may be used, so that N different intervals between consecutive messages are used. If M<N is used to generate fractions of $\Delta$, then it may be advantageous to use M such that it divides N, so that all fractions occur the same number of times.

Figure 22:
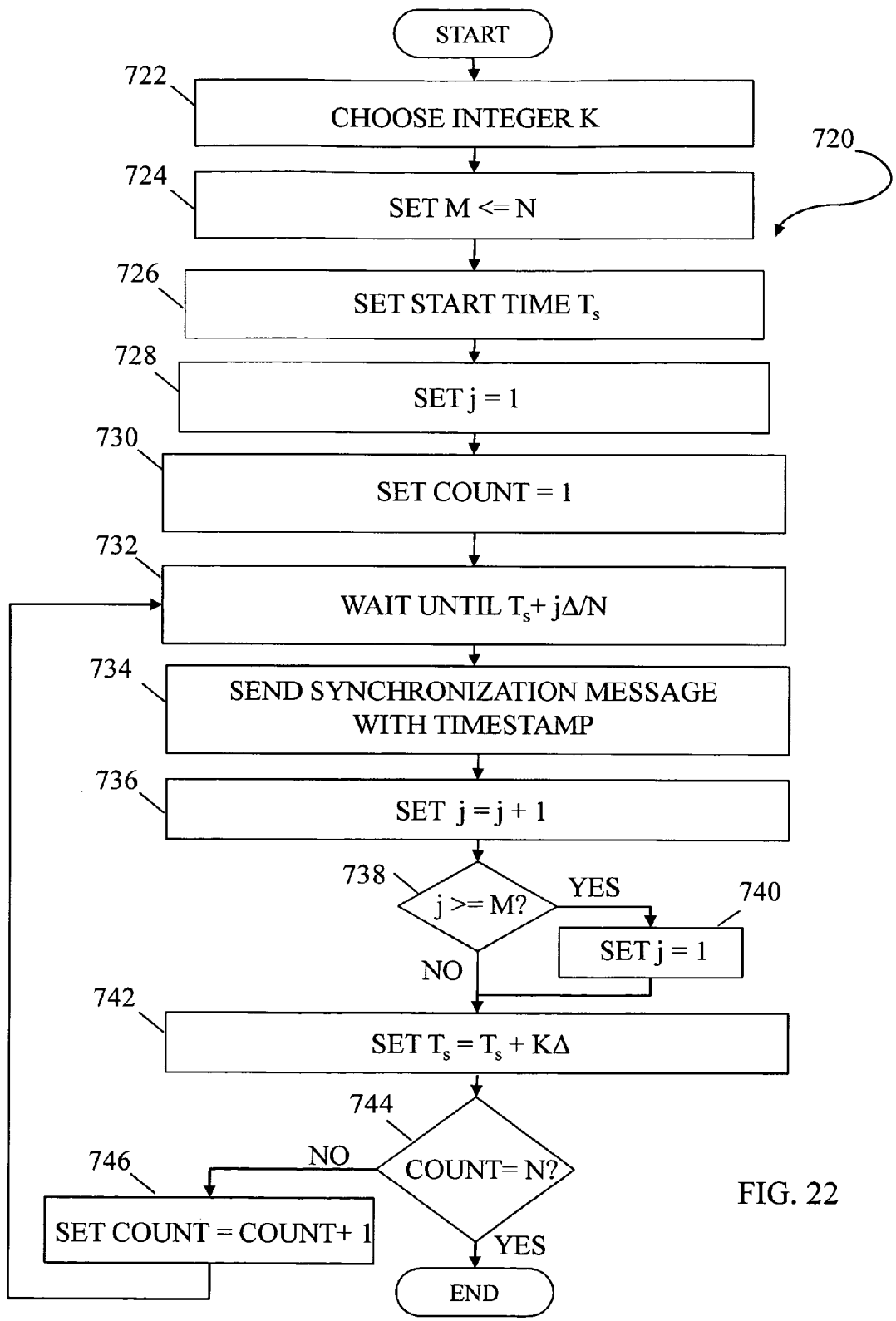
FIG. 22 shows a flow diagram showing a timing algorithm for uniformly spaced transmission times performed on the AP side according to an embodiment of the system described herein.

FIG. 22 is a flow diagram 720 showing a timing algorithm for uniformly spaced transmission times performed on the AP 32 side according to an embodiment of the system described herein. At a step 722, an integer K is chosen such that K$\Delta$ is greater than the expected worst-case maximum round trip time $t_8$-$t_1$. After the step 722, processing proceeds to a step 724 where a variable M is set for M<=N such that N is a multiple of M (or N=M). After the step 724, processing proceeds to a step 726 where the starting time $T_s$ is set. After the step 726, processing proceeds to a step 728 where a fraction counter j is set to 1. After the step 728, processing proceeds to a 730 where a counter, COUNT, is set to 1. After the step 730, processing proceeds to a step 732 where the AP 32 waits until time instant $T_s$+j$\Delta$/N. After the step 732, processing proceeds to a step 734 where the AP 32 sends a synchronization message with timestamp $L_1(t_1)$ equal to $T_s$+j$\Delta$/N. After the step 734, processing proceeds to a step 736 where fraction counter j is incremented (j=j+1). After the step 736, processing proceeds to a test step 738 where it is determined if j>=M. If so, then processing proceeds to a step 740 where j is set equal to 1. After the step 740, or after the test step 738 if j is not >=M, then processing proceeds to a step 742 where $T_s$ is set equal to $T_s$+K$\Delta$. After the step 742, processing proceeds to a test step 744 where it is determined if COUNT equals N (the algorithm having been performed N times for N being an integer value that is determined as further discussed elsewhere herein). If COUNT does not equal N, then processing proceeds to a step 746 where COUNT is incremented by 1. After the step 746, processing proceeds back to the step 732. Otherwise, if it is determined that COUNT does equal N at the test step 746, then processing is complete.

The algorithm of the flow diagram 720 does not take into account packet losses. Accordingly, in another embodiment it may be provided that if some responses do not arrive from N2 35, the AP 32 may chose to use the previous fraction of $\Delta$ to delay the next transmission. That is, at time $T_s$ the algorithm may check if a response arrived and restore the previous value of j. Alternatively, the fraction counter j may be increased only when a synchronization response arrives from N2 35. In both cases, the loop may count the number of responses instead of number of transmissions. As mentioned elsewhere herein, a maximum number of transmissions may be specified to break the loop when communication is lost, so that an infinite loop may be prevented.

Figure 23:
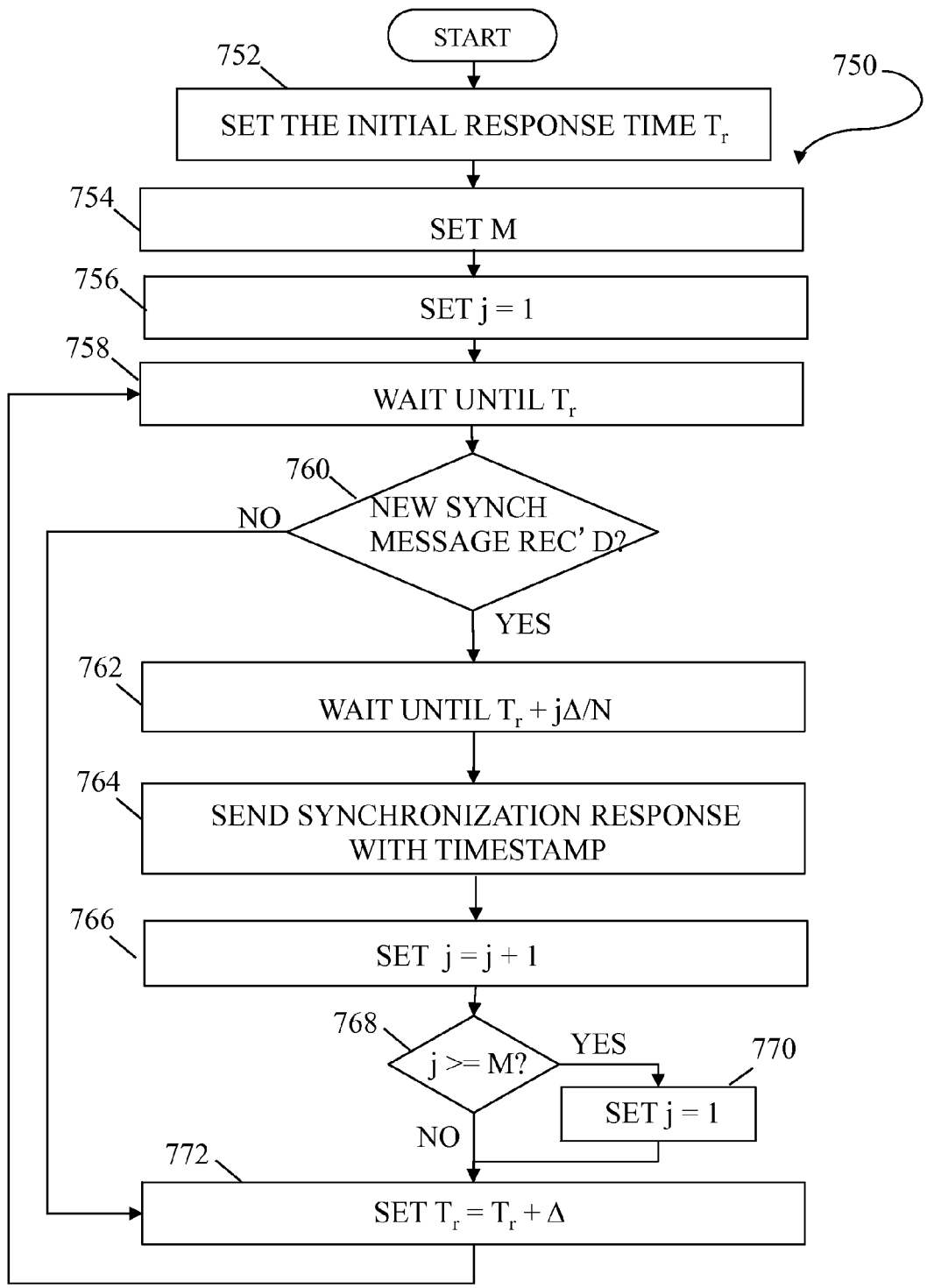
FIG. 23 is a flow diagram showing a timing algorithm for uniformly distributed transmission times on the sensor node N2 side according to an embodiment of the system described herein.

FIG. 23 is a flow diagram 750 showing a timing algorithm for uniformly distributed transmission times on the sensor node N2 35 side according to an embodiment of the system described herein. The algorithm shown in flow diagram 750 may be similar to the flow diagram 720 for random response time instances but, instead of using K$\Delta$ as the delay, a timing boundary is shifted after every $\Delta$ interval. At a step 752, an initial response time $T_r$ is set. After the step 752, processing proceeds to a step 754 where M is set the same as on the AP 32. After the step 754, processing proceeds to a step 756 where fraction counter j is set equal to 1. After the step 756, processing proceeds to a step 758 where the sensor node N2 35 waits until time instant $T_r$. After the step 758, processing proceeds to a test step 760 where the sensor node N2 35 checks if a new synchronization message has arrived from the AP 32. If a new synchronization message has arrived, then processing proceeds to a step 762 where the sensor node N2 35 waits until time instant $T_r$+j$\Delta$/N. After the step 762, processing proceeds to a step 764 where, at time instant $T_r$+j$\Delta$/N, the sensor node N2 35 sends a synchronization response with timestamp $L_2(t_5)$ equal to $T_r$+j$\Delta$/N. After the step 764, processing proceeds to a step 766 where fraction counter j is incremented (j=j+1). After the step 766, processing proceeds to a test step 768 where it is determined if j>=M. If so, then processing proceeds to a step 770 where j is set equal to 1. After the step 770, or after the test step 768 if j is not >=M, then processing proceeds to a step 772 where $T_r$ is set equal to $T_r$+$\Delta$. After the step 772, processing proceeds back to the step 756. If at the test step 760 it is determined that a new synchronization message has not arrived from the AP 32, then processing proceeds directly to the step 772.

As further discussed elsewhere herein, a simple approach to estimate clock offsets is to treat each timestamp quadruple independently and calculate a set of N offset estimates according to the formula $O^{(i)}=(L_1(t_8^{(i)})+L_1(t_{1(i)})-L_2(t_4^{(i)})-L_2(t_5^{(i)}))/2$. The set of individual estimates may then be used to calculate the resulting time offset estimate using, for example, arithmetic mean, median and/or their trimmed versions (with outliers rejected). It is noted, however, the with this approach the above-the-average and below-the-average values of transmission times $t_4$-$t_1$ and $t_8$-$t_5$ may not align on AP-N2 and N2-AP paths. Also, the $\Delta$ cycles on the AP 32 and N2 35 may not align. As a result, the collection of estimates $O^{(i)}$ may have unnecessarily large variation which would require the use of a larger sample size N.

A modification of this approach is to use the estimate $O^{(i)}$ for which the overall trip time $L_1(t_8^{(i)})-L_1(t_1^{(i)})$ is the shortest, as it should correspond to a smallest uncertainty in processing time (random delays should be smallest). However, this modification may not be particularly suitable for embodiments of the system described herein in which the delay on the node N2 35 may include components introduced by the timing algorithm used and which have nothing to do with processing delays on the AP 32 or N2 35. If, however, it is assumed that clock drift is negligible on both the AP 32 and the node N2 35 and the clock offset is approximately constant throughout the synchronization procedure, then transmission delays in both directions may be treated independently, and the shortest time from the AP 32 to the node N2 35 may be combined with the shortest time from the node N2 35 to the AP 32. This way, the best case shortest roundtrip from the AP 32 to the node N2 35 and then back to the AP 32 may be artificially synthesized from two one-way best cases.

According to an embodiment of the system described herein, the clock offset may be determined by first calculating a set of one-way trip delays:

$$D_{12}^{(i)} = L_2(t_4^{(i)}) - L_1(t_1^{(i)}) \text{ and } D_{21}^{(i)} = (L_1(t_8^{(i)}) - L_2(t_5^{(i)})).$$

It may be noted that because of the a priori unknown offset between the two clocks, these delays are biased. But, because the clock offset may be assumed as constant, the biased delays may still be used to select the minimal values and the offset estimate ($\hat{O}$) then calculated as:

$$\hat{O} = (\min D_{21}^{(i)} - \min D_{12}^{(i)})/2$$

According to another embodiment, another possibility is to sort the one-way delay values $D_{12}^{(i)}$ and $D_{21}^{(i)}$ to arrive at two sorted lists. These two lists may be trimmed to reject values that are too large based on the observed sample variance. Note that if such outlier rejection is used, it may only be applied to largest values, as those correspond to largest random delays. On the other hand, the smallest values correspond to small random delay components and may not be eliminated. After possible outlier rejection, individual offset estimates may be calculated using delay pairs with the same rank in the sorted lists:

$$(\tilde{O})^{(i)} = (D_{21}^{(i)} - D_{12}^{(i)})/2$$

The collection of values $\tilde{O}^{(i)}$ may be used to calculate the overall offset estimate through median, trimmed median, trimmed mean and/or other suitable estimation technique.

The system described herein advantageously allows utilizing synchronization message exchanges in which transmission time may be abnormal in one direction, but quite acceptable in the other. Offset estimates calculated from each of such message pairs would likely be outliers and thus useless for synchronization purposes. By separating the delays in both directions, the system provides for utilizing good one-way trips and rejecting the bad ones and thus using collected data more effectively. This allows using smaller number N of message exchanges and saves battery energy.

Various embodiments discussed herein may be combined with each other in appropriate combinations in connection with the system described herein. Additionally, in some instances, the order of steps in the flowcharts may be modified, where appropriate. Further, the system described herein may be implemented using software, hardware, and/or a combination of software and hardware. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of synchronizing a plurality of wireless devices, comprising:
sending a first set of multiple reference messages from an access point to each of the plurality of wireless devices, each of the multiple reference messages being sent to all of the plurality of wireless devices;
recording, at each of the wireless devices, a timestamp corresponding to each of the reference messages that is received;
in response to a request from the access point, sending from each of the wireless devices a response to the access point that includes the timestamps corresponding to the reference messages received at each of the wireless devices; and
determining, at the access point, relative clock offsets between each of the wireless devices using the timestamps, wherein the relative clock offsets are determined at the access point using only the timestamps corresponding to the reference messages received by the wireless devices that are recorded at each of the wireless devices and included in the responses sent to the access point from the wireless devices, the relative clock offsets between each of the wireless devices being determined independently of any timestamps recorded by the access point.

2. The method according to claim 1, further comprising:
scheduling, at the access point, synchronized actions of the wireless devices according to the relative clock offsets of the wireless devices determined by the access point.

3. The method according to claim 2, wherein each of the plurality of wireless devices is a wireless sensor, and wherein each of the wireless sensors collects data in synchronization with other of the wireless sensors according to the scheduled actions.

4. The method according to claim 1, wherein the access point determines additional offsets between the access point and the wireless devices using timestamps attached to the response by the wireless devices and using a first access point timestamp attached to the request by the access point and a second access point timestamp attached to the responses received by the access point from the wireless devices.

5. The method according to claim 1, wherein a second set of multiple reference messages are sent from the access point to the plurality of wireless devices.

6. The method according to claim 1, further comprising:
estimating clock drift rate of each of the plurality of wireless devices.

7. The method according to claim 6, wherein the access point retains data of the clock drift rate for each of the plurality of wireless devices.

8. The method according to claim 1, wherein the first set of multiple reference messages are transmitted by the access point to the wireless devices after an expected wake up time of each of the wireless devices from a sleep mode.

9. The method according to claim 8, wherein each of the wireless devices requires synchronization after waking up from the sleep mode.

10. A computer readable storage medium storing computer software that synchronizes a plurality of wireless devices, the computer software comprising:

executable code that sends a set of multiple reference messages from an access point to each of the plurality of wireless devices, each of the multiple reference messages being sent to all of the plurality of wireless devices;

executable code that records, at each of the wireless devices, a timestamp corresponding to each of the reference messages that is received;

executable code that, in response to a request from the access point, sends from each of the wireless devices a response to the access point with the timestamps corresponding to the reference messages received at each of the wireless devices; and executable code that determines, at the access point, relative clock offsets between each of the wireless devices using the timestamps, wherein the relative clock offsets are determined at the access point using only the timestamps corresponding to the reference messages received by the wireless devices that are recorded at each of the wireless devices and included in the responses sent to the access point from the wireless devices, the relative clock offsets between each of the wireless devices being determined independently of any timestamps recorded by the access point.

11. The computer readable storage medium according to claim 10, further comprising:

executable code that schedules, at the access point, synchronized actions of the wireless devices according to the relative clock offsets of the wireless devices determined by the access point.

12. The computer readable storage medium according to claim 10, wherein the access point determines additional offsets between the access point and the wireless devices using timestamps attached to the response by the wireless devices and using a first access point timestamp attached to the request by the access point and a second access point timestamp attached to the responses received by the access point from the wireless devices.

13. The computer readable storage medium according to claim, wherein the first set of multiple reference messages are transmitted by the access point to the wireless devices after an expected wake up time of each of the wireless devices from a sleep mode.

14. The computer readable storage medium according to claim 13, wherein each of the wireless devices requires synchronization after waking up from the sleep mode.

15. A method of synchronizing a first wireless device and a second wireless device, comprising:

sending a synchronization message from the first wireless device to the second wireless device, wherein the synchronization message includes a first timestamp generated by the first wireless device;

receiving the synchronization message at the second wireless device, wherein the second wireless device records a second timestamp corresponding to receipt of the synchronization message;

sending a synchronization response from the second wireless device, wherein the synchronization response includes the first timestamp, the second timestamp, and a third timestamp corresponding to the sending of the synchronization response by the second wireless device;

receiving the synchronization response at the first wireless device, wherein the first wireless device records a fourth timestamp corresponding to receipt of the synchronization response; and determining a relative clock offset of the first wireless device and the second wireless device using a set of timestamps including the first timestamp, the second timestamp, the third timestamp and the fourth timestamp, wherein the set of timestamps used to determine the relative clock offset of the first and second wireless devices further includes timestamps corresponding to multiple synchronization messages or multiple synchronization responses that are transmitted according to controlled delay times, the controlled delay times being determined and applied to reduce an effect of an operation cycle bias of the wireless devices on the determination of the relative clock offset.

16. The method according to claim 15, wherein the set of timestamps includes the timestamps corresponding to the multiple synchronization messages and the multiple synchronization responses transmitted according to the controlled delay times.

17. The method according to claim 15, wherein the controlled delay times for the transmitting of the multiple synchronization messages or the multiple synchronization responses include randomized delay times.

18. The method according to claim 15, wherein the controlled delay times for the transmitting of the multiple synchronization messages or the multiple synchronization responses include uniformly spaced delay times, wherein the uniformly spaced delay times are uniformly increasing delay times.

19. The method according to claim 18, wherein the uniformly increasing delay times increase by an amount corresponding to a fraction of the operating cycle.

20. The method according to claim 15, wherein the relative clock offset is determined using at least one of the following: two sorted lists of one-way delays between each of the first wireless device and the second wireless device, and two minimal one-way delays between each of the first wireless device and the second wireless device.

21. A computer readable storage medium storing computer software that synchronizes a first wireless device and a second wireless device, the computer software comprising:

executable code that sends a synchronization message from the first wireless device to the second wireless device, wherein the synchronization message includes a first timestamp generated by the first wireless device;

executable code that receives the synchronization message at the second wireless device, wherein the second wireless device records a second timestamp corresponding to the synchronization message that is received;

executable code that sends a synchronization response from the second wireless device, wherein the synchronization response includes the first timestamp, the second timestamp, and a third timestamp corresponding to the sending of the synchronization response by the second wireless device;

executable code that receives the synchronization response at the first wireless device, wherein the first wireless device records a fourth timestamp corresponding to receipt of the synchronization response; and executable code that determines a relative clock offset of the first wireless device and the second wireless device using a set of timestamps including the first timestamp, the second timestamp, the third timestamp and the fourth timestamp, wherein the set of timestamps used to determine the relative clock offset of the first and second wireless devices further includes timestamps corresponding to multiple synchronization messages or multiple synchronization responses that are transmitted according to controlled delay times, the controlled delay times being determined and applied to reduce an effect of a bias of an operation cycle of the wireless devices on the determination of the relative clock offset.

22. The computer readable storage medium according to claim 21, wherein the set of timestamps includes the timestamps corresponding to the multiple synchronization messages and the multiple synchronization responses transmitted according to the controlled delay times.

23. The computer readable storage medium according to claim 21, wherein the controlled delay times for the transmitting of the multiple synchronization messages or the multiple synchronization responses include randomized delay times.

24. The computer readable storage medium according to claim 21, wherein the controlled delay times for the transmitting of the multiple synchronization messages or the multiple synchronization responses include uniformly spaced delay times, wherein the uniformly spaced delay times are uniformly increasing delay times.

25. The computer readable storage medium according to claim 24, wherein the uniformly increasing delay times increase by an amount corresponding to a fraction of the operating cycle.

26. The computer readable storage medium according to claim 22, wherein the relative clock offset is determined using at least one of the following: two sorted lists of one-way delays between each of the first wireless device and the second wireless device, and two minimal one-way delays between each of the first wireless device and the second wireless device.

* * * * *